Figure 1:
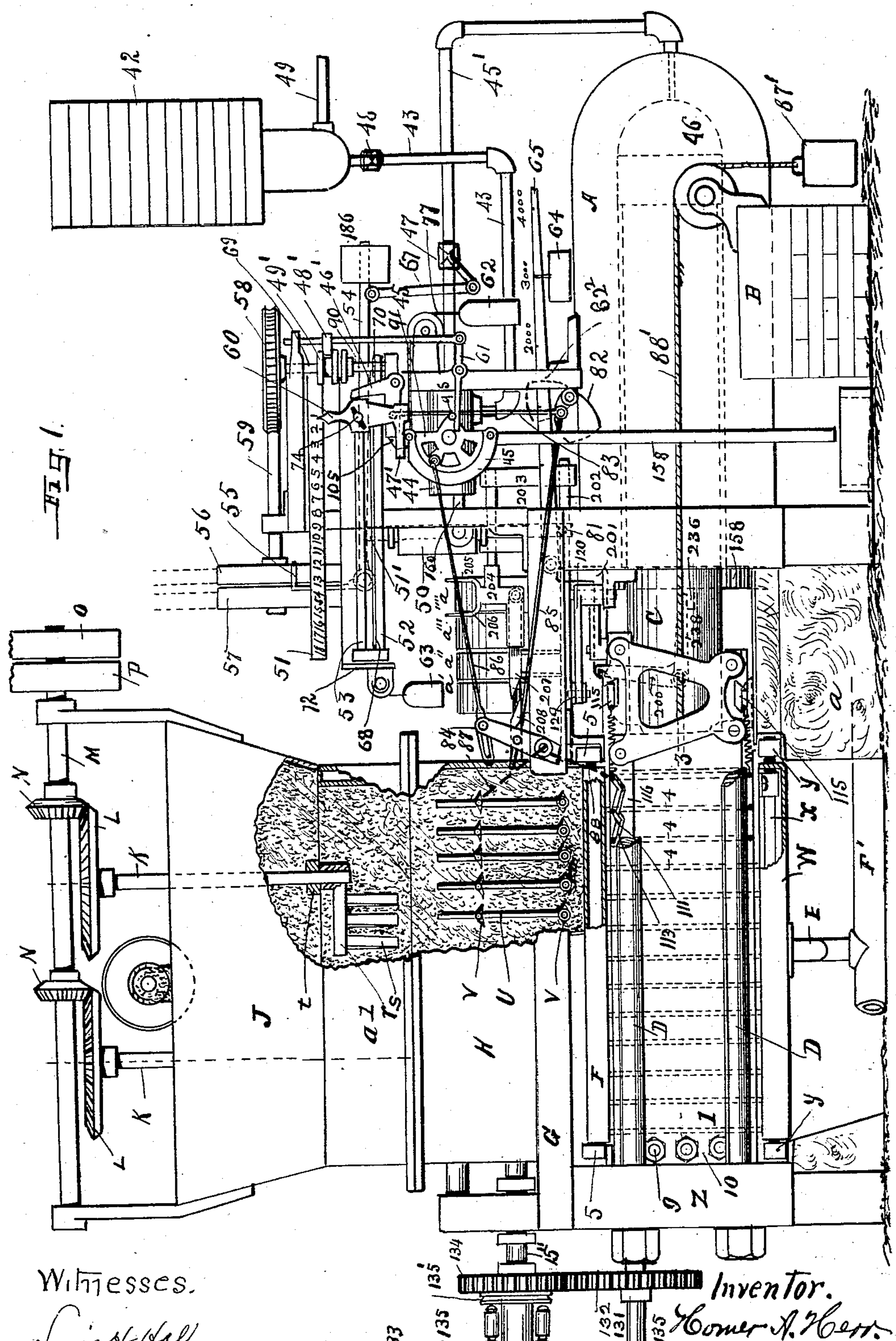

H. A. HERR.

AUTOMATIC PRESS FOR EXTRACTING OIL FROM SEED MEAL.

APPLICATION FILED MAR. 15, 1904.

968,153.

Patented Aug. 23, 1910.

10 SHEETS—SHEET 1.

Witnesses.

Louis H. Hall

Thomas D. Hoskins

Inventor.

Homer A. Herr.

THE NORRIS PETERS CO., WASHINGTON, D. C.

H. A. HERR.

AUTOMATIC PRESS FOR EXTRACTING OIL FROM SEED MEAL.

APPLICATION FILED MAR. 15, 1904.

968,153. Patented Aug. 23, 1910.

10 SHEETS—SHEET 2.

Witnesses:

Louis H. Hall

Thomas D. Hoskins

Inventor

Homer A. Herr

THE NORRIS PETERS CO., WASHINGTON, D. C.

H. A. HERR.

AUTOMATIC PRESS FOR EXTRACTING OIL FROM SEED MEAL.

APPLICATION FILED MAR. 15, 1904.

968,153. Patented Aug. 23, 1910.

10 SHEETS—SHEET 3.

Witnesses:
C. C. Clifford
Thomas D. Hoskins

Inventor,
Homer A. Herr.

THE NORRIS PETERS CO., WASHINGTON, D. C.

H. A. HERR.
AUTOMATIC PRESS FOR EXTRACTING OIL FROM SEED MEAL.
APPLICATION FILED MAR. 15, 1904.
968,153.
Patented Aug. 23, 1910.
10 SHEETS—SHEET 4.
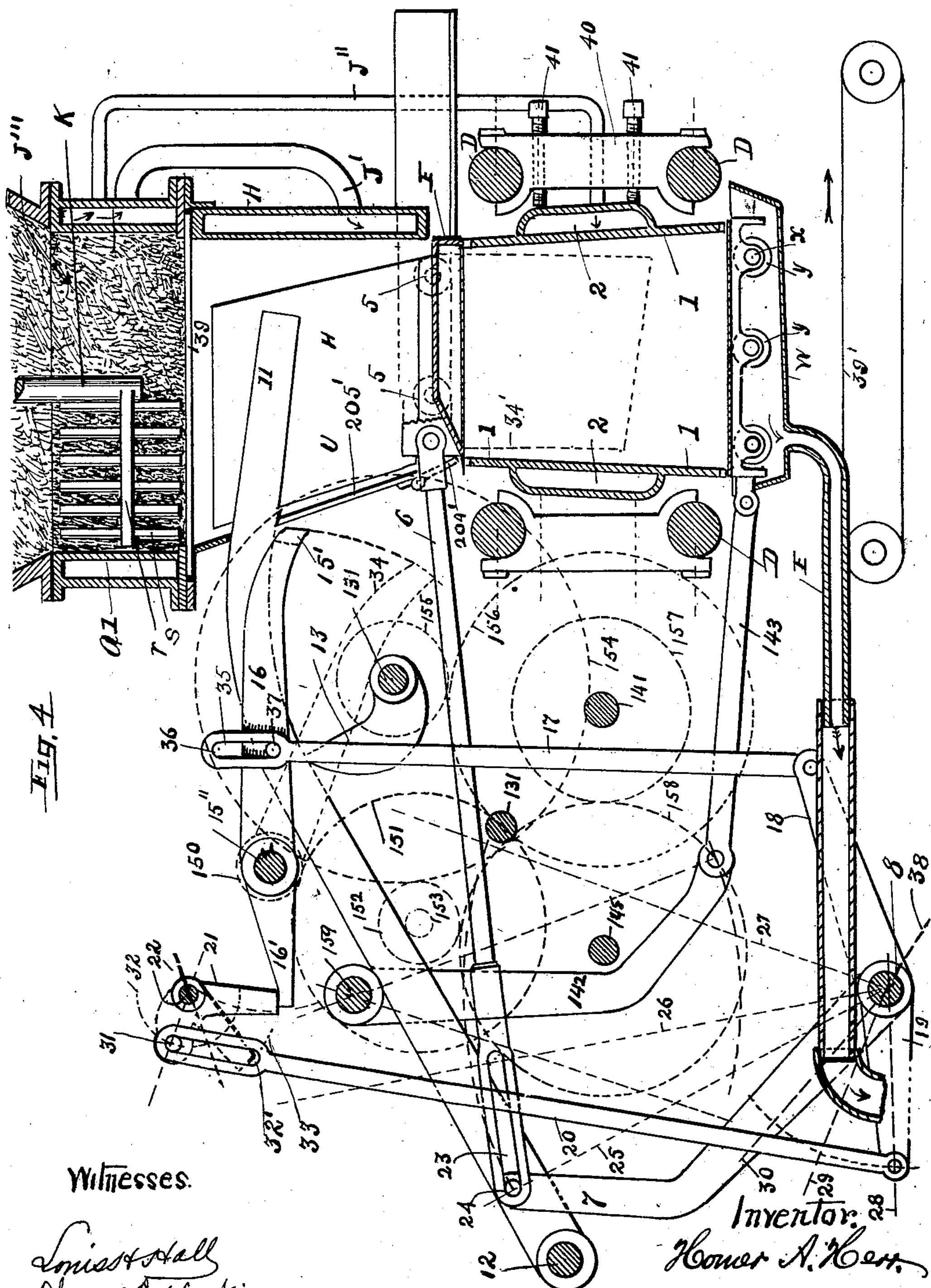
Witnesses.
Louis H. Hall
Thomas D. Hoskins
Inventor:
Homer A. Herr.
THE NORRIS PETERS CO., WASHINGTON, D. C.

H. A. HERR.
AUTOMATIC PRESS FOR EXTRACTING OIL FROM SEED MEAL.
APPLICATION FILED MAR. 15, 1904.
968,153.
Patented Aug. 23, 1910.
10 SHEETS—SHEET 5.
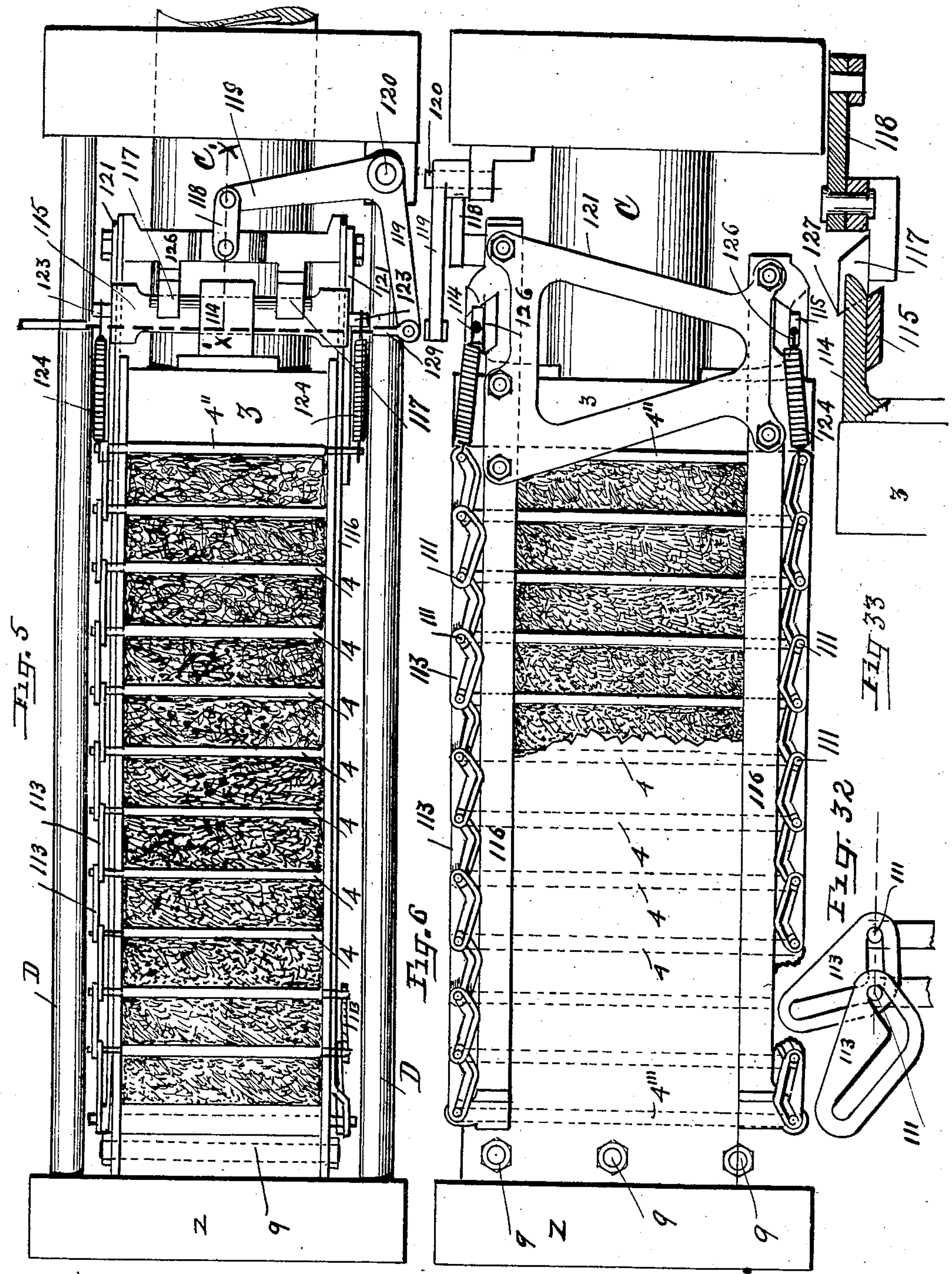
Witnesses.
Thomas D. Hoskins
Louis H. Hall
Inventor.
Homer A. Herr
THE NORRIS PETERS CO., WASHINGTON, D. C.

H. A. HERR.
AUTOMATIC PRESS FOR EXTRACTING OIL FROM SEED MEAL.
APPLICATION FILED MAR. 15, 1904.
968,153. Patented Aug. 23, 1910.
10 SHEETS—SHEET 6.
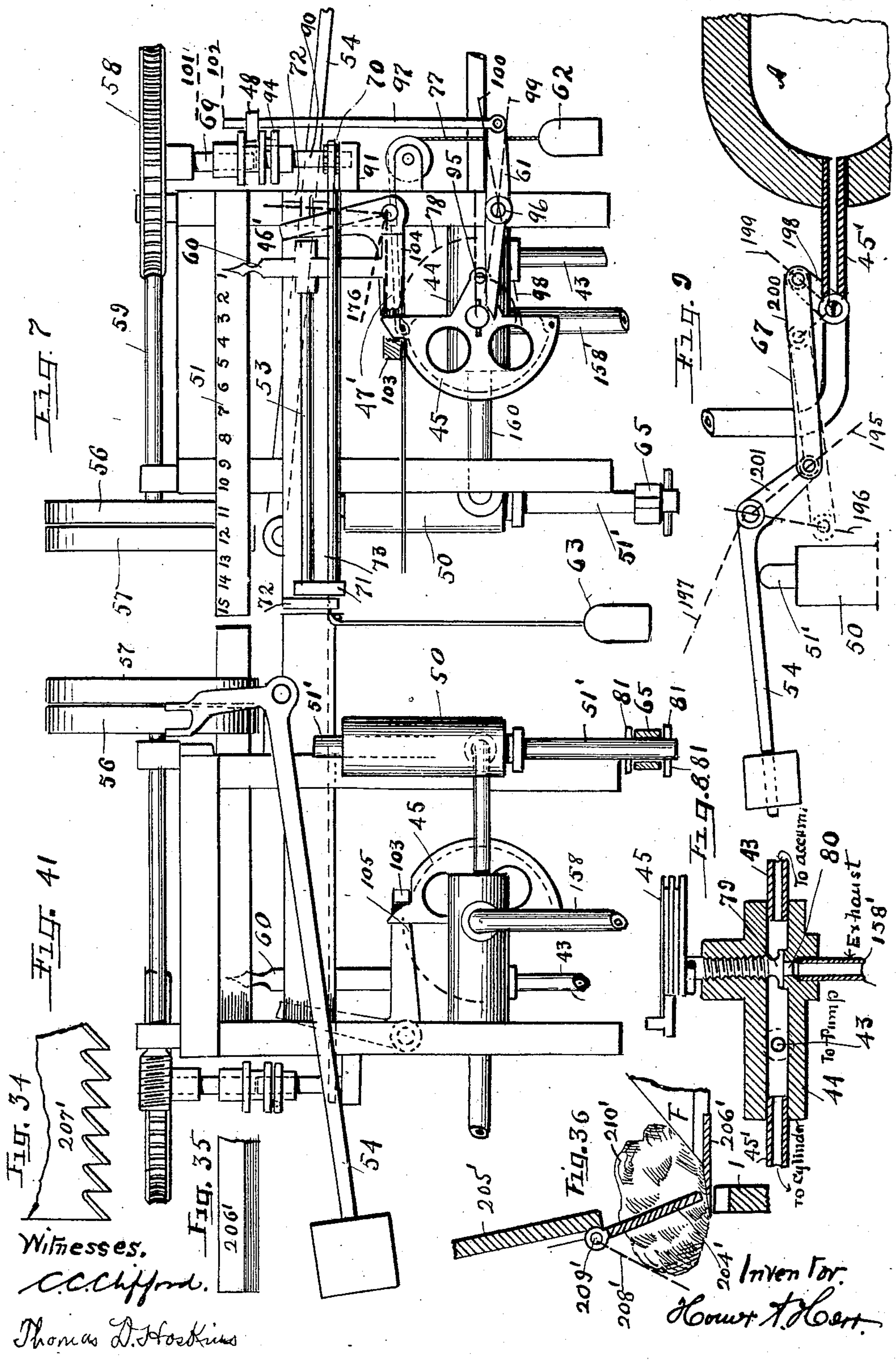
Witnesses.
C. C. Clifford.
Thomas D. Hoskins
Inventor.
Homer A. Herr.
THE NORRIS PETERS CO., WASHINGTON, D. C.

H. A. HERR.
AUTOMATIC PRESS FOR EXTRACTING OIL FROM SEED MEAL.
APPLICATION FILED MAR. 15, 1904.
968,153. Patented Aug. 23, 1910.
10 SHEETS—SHEET 7.
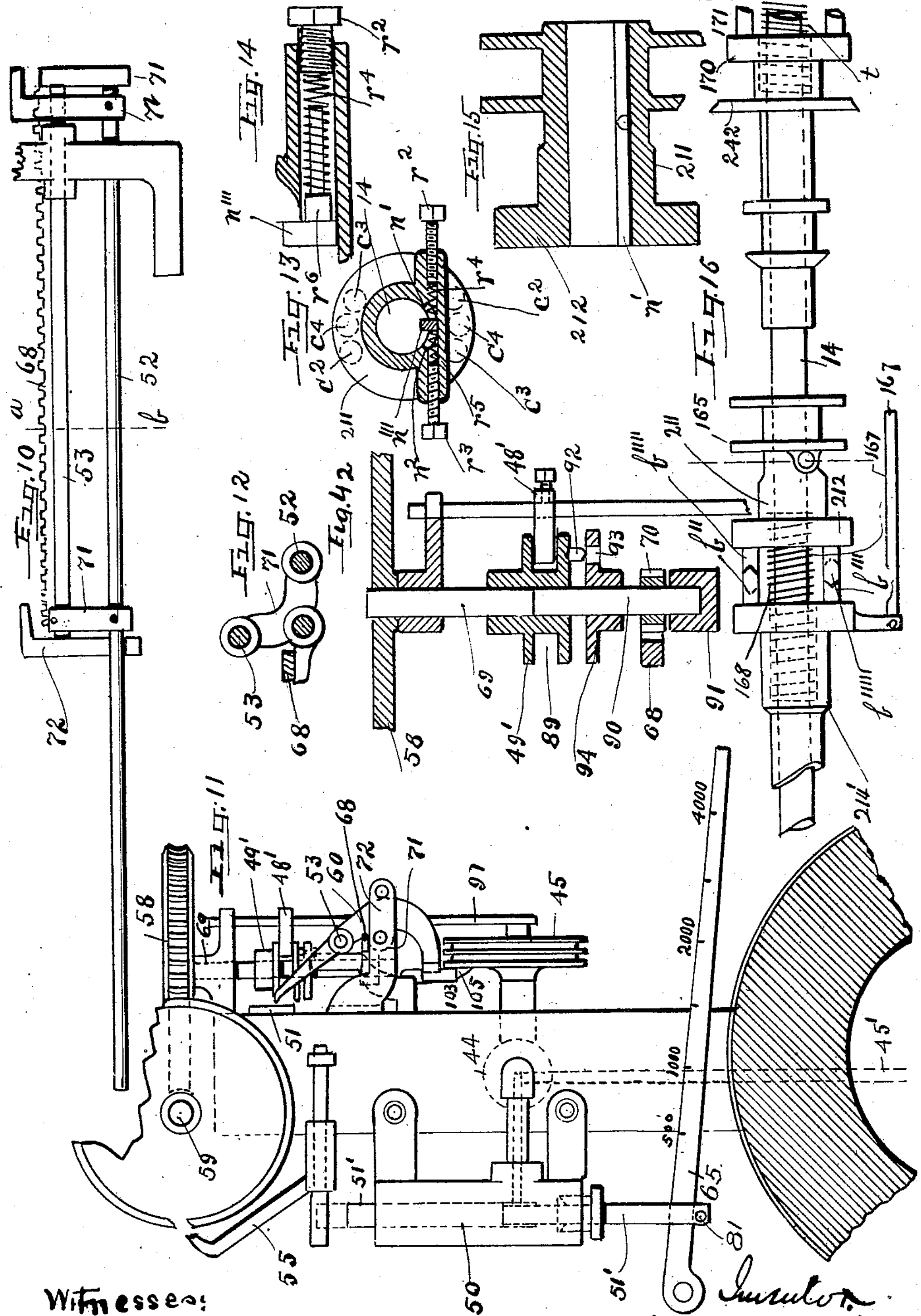
Witnesses:
C. C. Clifford
Thomas D. Hoskins
Inventor
Homer A. Herr.
THE NORRIS PETERS CO., WASHINGTON, D. C.

H. A. HERR.
AUTOMATIC PRESS FOR EXTRACTING OIL FROM SEED MEAL.
APPLICATION FILED MAR. 15, 1904.
968,153. Patented Aug. 23, 1910.
10 SHEETS—SHEET 8.
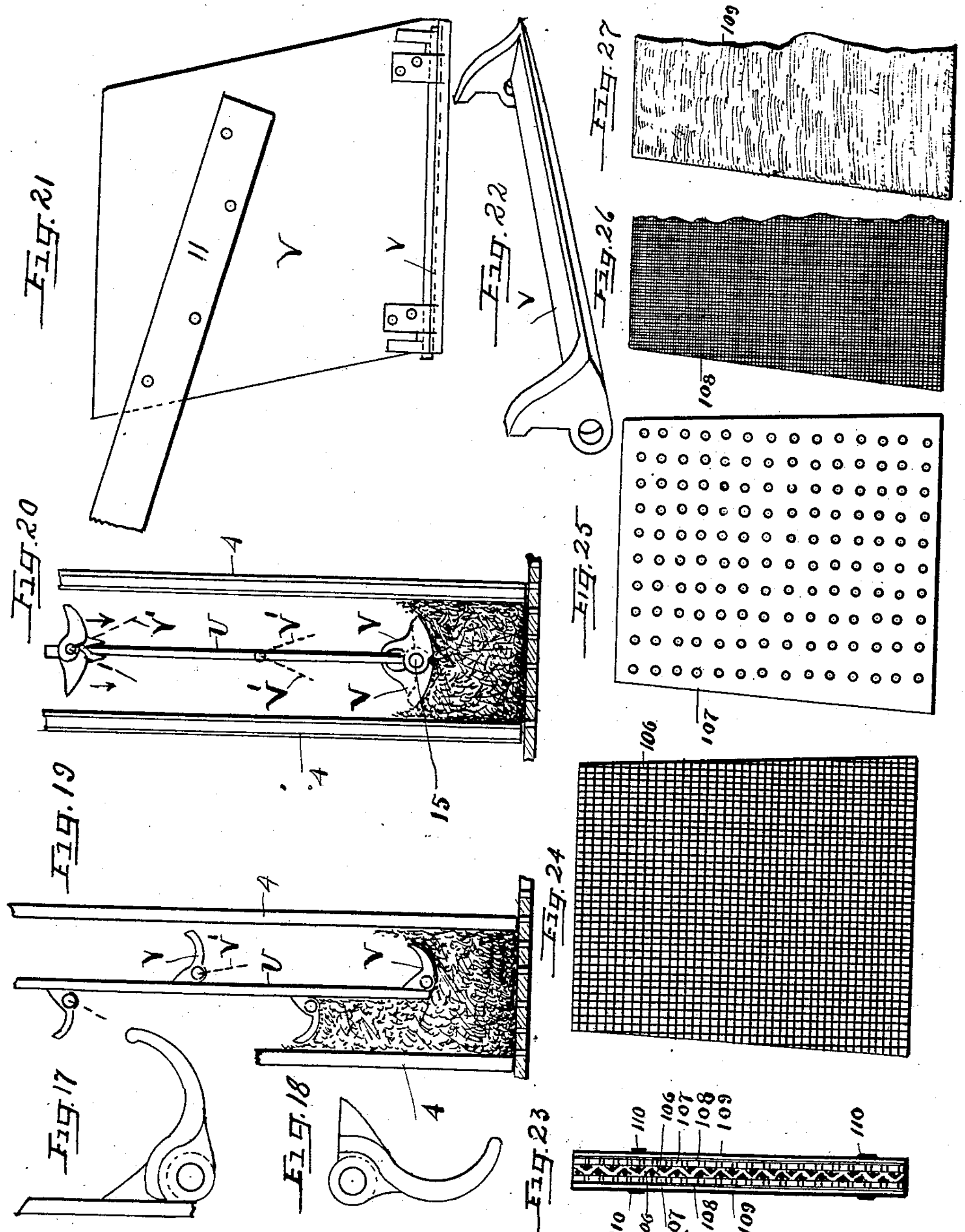
Witnesses
Louis H. Hall
Thomas D. Hoskins
Inventor.
Homer A. Herr.
THE NORRIS PETERS CO., WASHINGTON, D. C.

H. A. HERR.
AUTOMATIC PRESS FOR EXTRACTING OIL FROM SEED MEAL.
APPLICATION FILED MAR. 15, 1904.
968,153. Patented Aug. 23, 1910.
10 SHEETS—SHEET 9.
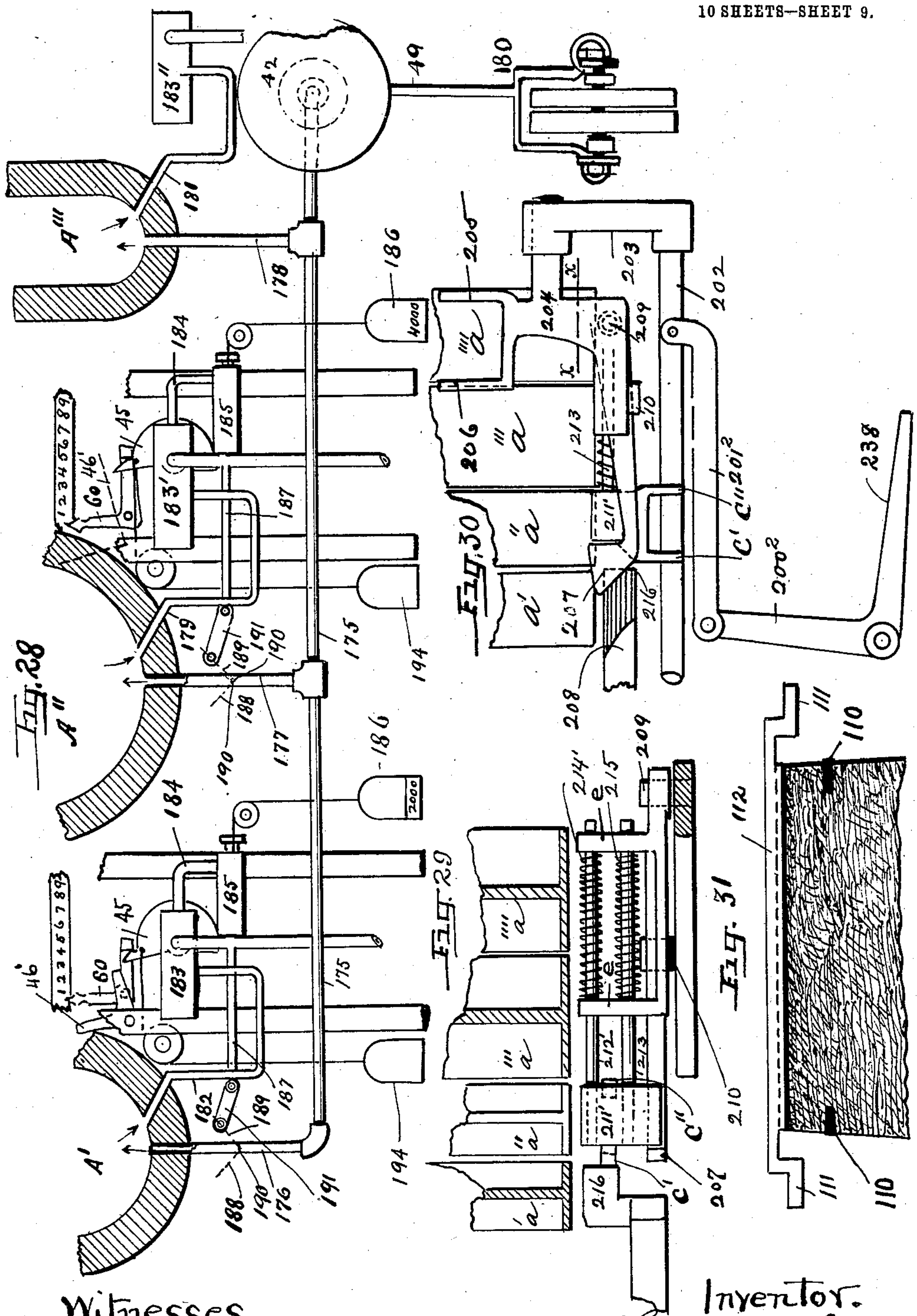
Witnesses
C. C. Clifford
Thomas D. Hoskins
Inventor.
Homer A. Herr
THE NORRIS PETERS CO., WASHINGTON, D. C.

H. A. HERR.
AUTOMATIC PRESS FOR EXTRACTING OIL FROM SEED MEAL.
APPLICATION FILED MAR. 15, 1904.
968,153. Patented Aug. 23, 1910.
10 SHEETS—SHEET 10.
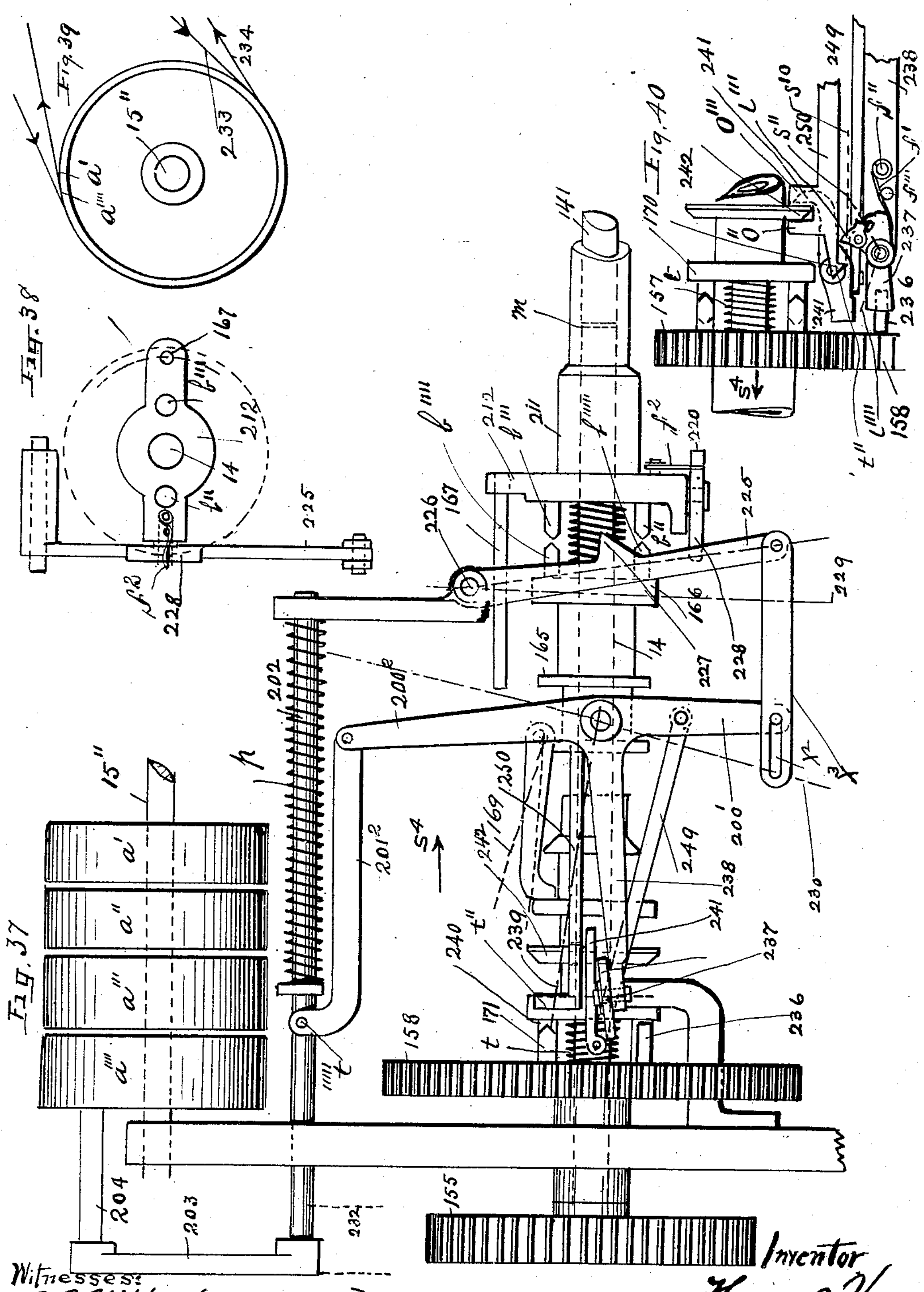
Witnesses:
C. C. Clifford
Thomas D. Hoskins
Inventor
Homer A. Herr
THE NORRIS PETERS CO., WASHINGTON, D. C.

UNITED STATES PATENT OFFICE.

HOMER A. HERR, OF PHILADELPHIA, PENNSYLVANIA.

AUTOMATIC PRESS FOR EXTRACTING OIL FROM SEED-MEAL.

968,153. Specification of Letters Patent. Patented Aug. 23, 1910.

Application filed March 15, 1904. Serial No. 198,259.

*To all whom it may concern:*

Be it known that I, HOMER A. HERR, a citizen of the United States, residing at Philadelphia, in the county of Philadelphia and State of Pennsylvania, have invented certain new and useful Improvements in Automatic Presses for Extracting Oil from Seed-Meal, of which the following is a specification.

My invention has reference to automatic liquid extracting presses and consists of features fully set forth in the following specification and the accompanying drawing forming part thereof.

While it relates to liquid extracting presses, my present invention has reference more particularly to the expressing of oil from seeds, such as cotton seed, flaxseed and other seeds requiring a heated condition of the meal while under pressure.

In my application filed Nov. 6th, 1902, No. 130,239 and Oct. 6th, 1903, No. 176,020 I show an automatic liquid extracting press. That is the feeding of the material into the press, the starting of the pressure, the stopping of the pressure, the sustaining of the pressure for a predetermined time, the predetermining of this time, the returning of the elements to their normal position, the opening and the closing of the bottom of the compression chamber and the discharging of the residuum from the said chamber while open: all of which functions are automatic.

This present invention includes the automatic features above enumerated, but is an improvement thereon in the specific arts stated, *i. e.:* vegetable oils or seed oils. It is well known that oil will not flow readily unless at a certain heated condition and the present presses must be operated almost one half of a day before they are in condition of heat to permit the free flow of the oil. This entails a great waste of oil. I heat my oil compression chamber and this obviates all the useless waste now such a universal source of loss to the oil mills.

The present practice in the extraction of oil from seed meal is to first grind the seed to a fine flour, heat it and form it into cakes as a matter of convenience in the handling then wrap this cake with a cloth which will perform the function of strainer, after which the cake, so wrapped, is put into the press, one cake on the top of another until the press is full, after which the pressure is applied by the turning on of the water either by the starting of a pump or the opening of a valve leading to an accumulator. All these different operations require labor and make the margin of profit exceedingly small in the oil mill. They not only require labor but exceeding care in some of the essential functions. My invention obviates all this labor and makes what has been heretofore considered an impossibility: an automatic and practical oil mill.

It consists, in combination with the features above set out of a steam jacketed movable lid for the chamber wherein the compression is accomplished; also heated sides for this chamber. The heat can be produced by any means, steam, hot water, electricity or any of the well known means for heat generation. Above the lid is the meal warmer and meal cooker. Above the cooker is the supply of meal, fed to the said cooker by a conveyer from the rollers of the grinding machine (not shown).

A further feature of my present machine is to supply a knife on the forward moving end of the lid, a highly useful element in an automatic machine of this class. This knife can be made in any manner that will accomplish the object of its design, which is to facilitate the passage of the lid through the material to be pressed, and to cut through any material which by its abnormal resistance to the slowly moving lid may possibly injure the machine, or some of its lid propelling elements. These knives should in some cases be made reciprocating, in such arts as fish oil extraction and the expressing of oil from meat scraps, for instance.

A further feature of my invention is to provide a safety gate for the lid in the vent of any substance being caught or retained in the material that the knife will not cut. This gate consists of a spring controlled wing carried by the compression chamber which wing will yield on pressure being exerted thereon by some foreign object being by accident left in the material in the chamber. In the absence of this safety gate the interposition of such material would break the machine. This prevents such accidents absolutely.

In my application filed Oct. 6 1903, above referred to I show a sustainer for high maximum pressure fixed to and coacting with an individual pump. The design in that application being to use one sustainer or one high pressure sustaining device to each pump and one pump to each press.

A further feature of my present invention is to provide a fixed high pressure sustainer for each of a series of presses and a common pump or a common accumulator, whereby the pump is continuous in its action and the accumulator constant and uniform in its pressure, in so far as the connection between the accumulator and the hydraulic cylinders are concerned. Of course the pressure in the hydraulic cylinder when it is operated by an accumulator is not the same as is the pressure in the liquid conductor leading from the accumulator to the said cylinder, until the said cylinder is forced up to gage of pressure. Now while I speak of a series of presses in combination with a common pump or an accumulator I of course do not mean that this feature of my invention cannot be used with a single pump, or with a single accumulator and single pump combined, or indeed without any accumulator at all. I do not limit myself in this regard and my desire will be pointed out in the claims.

It may be well at this time to note that I regard the pump and the accumulator as equivalents for the purpose of my invention. The admission of water into the hydraulic cylinder furnishes the power for producing the pressure on the ram. Now when my presses are arranged in series the opening of a valve admits this water from the pressure in the accumulator; when, however, a single press is used it is admitted directly from the pump without the intervention of the accumulator. I, therefore, desire it understood that I consider the opening of the valve of my pressure sustaining device, which admits the water from the accumulator, as an equivalent to the starting of the fast pulley on the pump. In either case the cylinder and the ram it carries are brought under the action of compressed water through the automatic means furnished in and by my pressure sustainer. While I may file specific individual applications later to cover these features specifically, in this present case I claim broadly the means for automatically controlling the pressure in a series of presses by liquid compression either from the pump, or through the accumulator and either through the respective cylinders as intermediate conductors of the liquid from the pump or accumulator to their respective pressure controllers or otherwise. I also desire it understood that when I use the term belt shifter I do not limit myself to the implied limitations of this term. There are many other ways in which power and motion can be shifted than by a belt. All old. I could use a friction clutch, a jaw clutch or an electrical armature, I place no restrictions on my resources in this regard. They are all equivalents. The specific naming of them is not essential.

A still further feature of my present invention is to provide the mechanism which actuates the lid and bottom with a means to absolutely insure its locking contact at every degree of the circle of the clutch on the shaft which carries it. The rotation of this clutch is strictly the cycle of the machine. This consists of providing a key fixed to the shaft and having a longitudinal slot in the clutch in which this key moves with an enlarged annular cross section, in other words wider than the accommodation of the key calls for. Two springs are carried by the moving part of the clutch. These springs operate compression fingers, an adjusting screw forces the springs against the fingers adjustably and hold the fingers against the key in the shaft. Now as the springs are of like power the pressure on either side of the said key is uniform and, therefore, the clutch is held with the key in the center of the enlarged longitudinal slot. The clutch will, therefore, rotate to the right or to the left of its normal position on the shaft, compressing the right or the left spring and engaging the jaws at all times, as will be more fully described more at length hereinafter.

A still further feature of my invention is to provide each press, whether used singly or in series, with a device for holding the pressure in case of leakage of valves or fittings. This consists of a valve chamber which carries an exhaust valve for exhausting the water from the cylinders and the high pressure pipes and fittings. An accumulator is connected directly with the cylinder. As the accumulator is raised to a predetermined point it strikes a weighted belt shifter. The belt is to be considered as normally on the fast pulley and this accumulator raises and shifts the belt by so doing, the said belt is shifted to the loose pulley. This stops the pump and arrests further pressure. Should leakage exist the said weight of the belt shifter will shift the belt to the fast pulley, thus again pumping up the pressure. If there is no leakage the accumulator will hold the belt on the loose pulley.

In order to exhaust the water from the cylinder and return the pressure to zero and all the pressure producing elements to their normal position, I provide a lock for the accumulator and this lock is actuated by the trip which permits the opening of the exhaust water valve. The accumulator is only locked when a time period for high pressure sustaining has lapsed, and this time period is predetermined by the indicator carried by the pressure sustainer. The accumulator is unlocked by some moving part of the mechanism at about the time the lid of the compression chamber is closed. This lock is only used when I employ an accumulator, as it is not necessary when I employ a pump alone. These features will be explained more at length hereinafter in connection with the drawings.

Other specific features will be explained more at length hereinafter.

In the drawings like parts are referred to by marks or figures of a corresponding kind in the different views.

Figure 2:
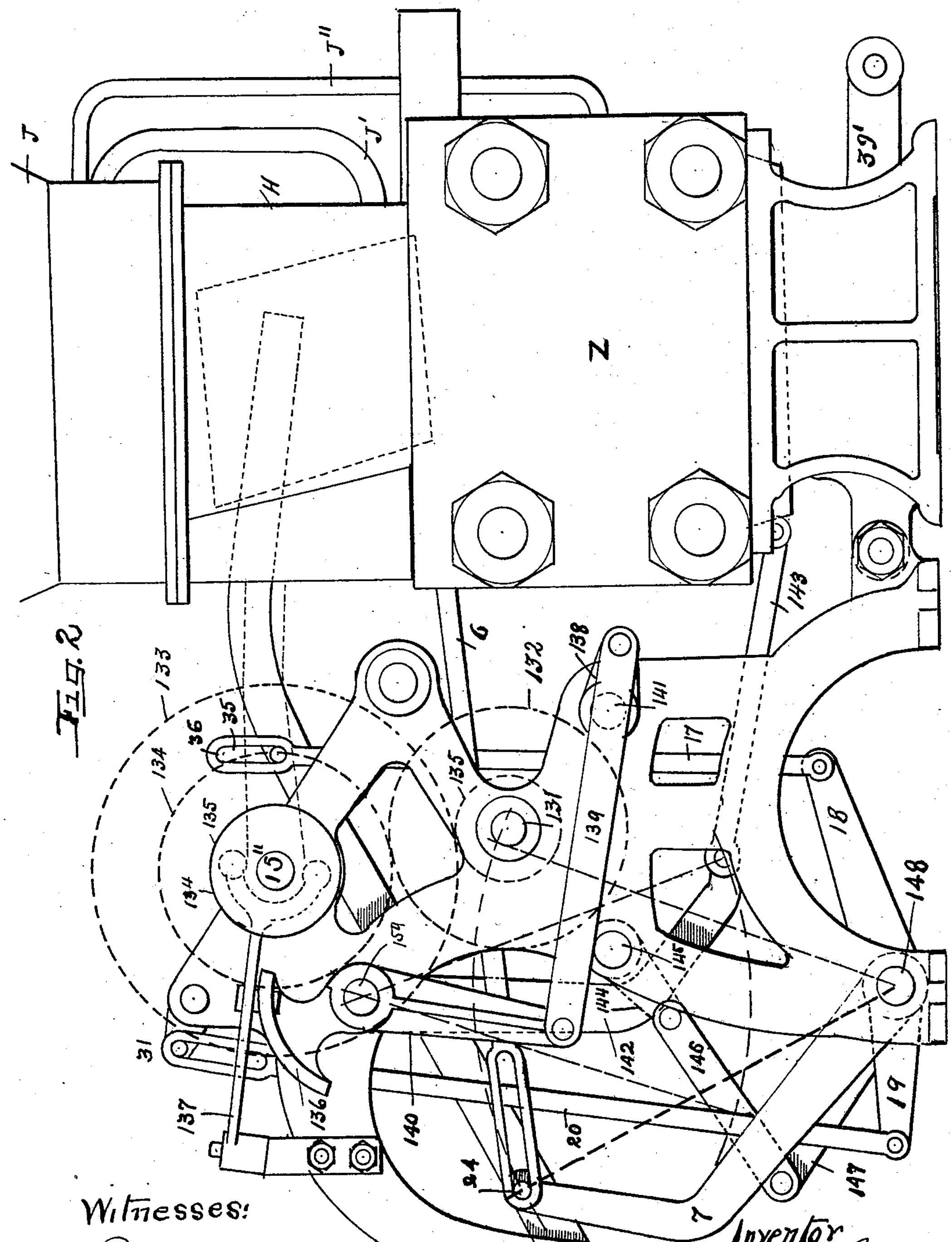
Figure 3:
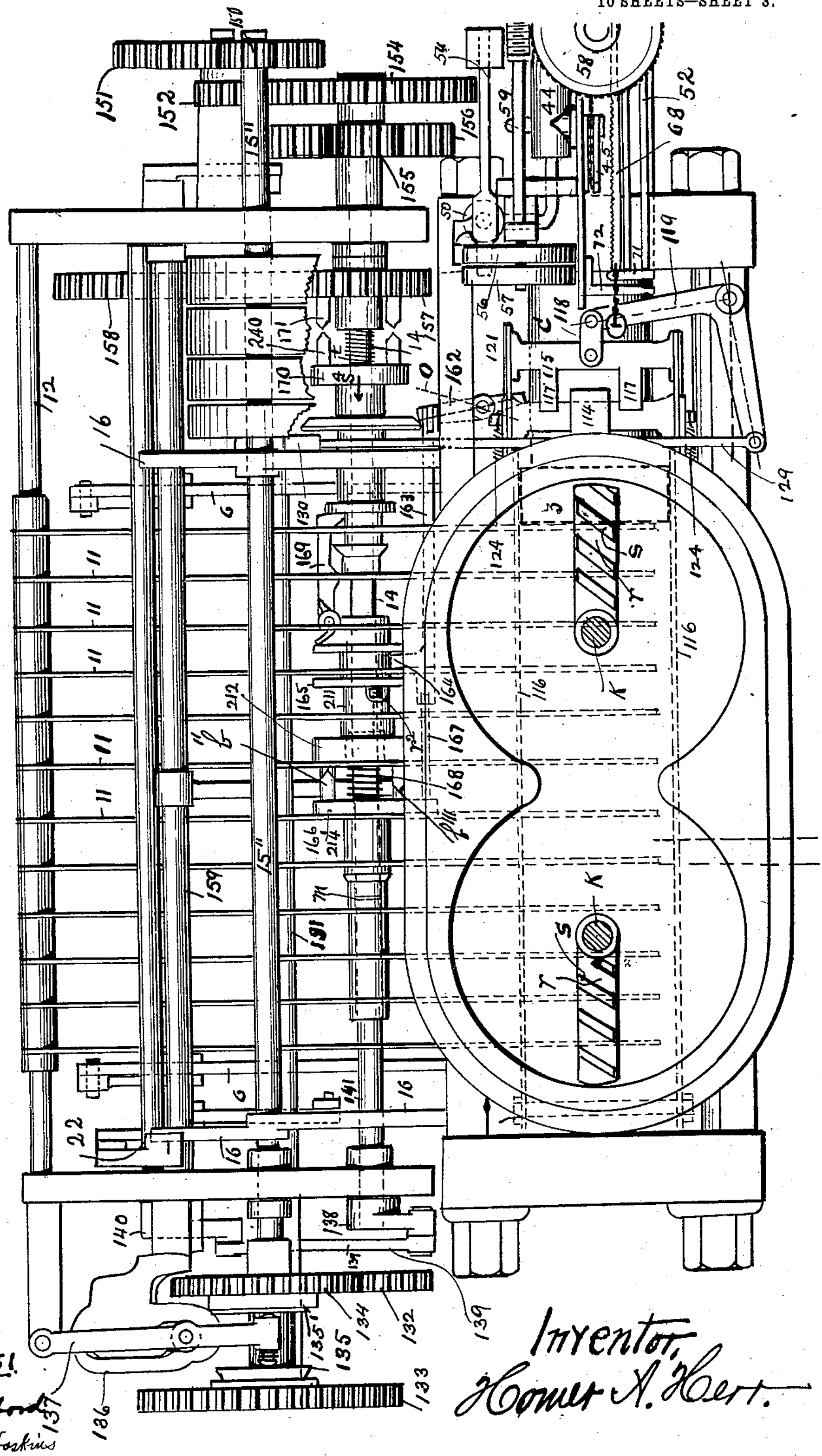

Figure 1 is a side elevation of my machine with a section of the heater and warmer broken away. Fig. 2 is an end view. Fig. 3 is a general plan with the hopper, heater, a portion of the time recorder and pressure sustainer shown and a portion removed. Fig. 4 is a transverse section through the machine showing the heater loaded with meal previous to the commencing of a day's work. Fig. 5 is a plan of the compression chamber. Fig. 6 is a side elevation of the compression chamber, these two latter views are the parts taken from the machine. Fig. 7 is a front view of the pressure sustainer. Fig. 8 is a horizontal section of the valve chamber. Fig. 9 is a section through the hydraulic cylinder which has its valve shut off by the accumulator of the time recorder, and thus arresting the water feed to the cylinder instead of arresting this feed by the shifting of the belt. Fig. 10 is a view of the valve trip guiding rods removed from the machine. Fig. 11 is an end view of the pressure sustainer mounted on the cylinder. Fig. 12 a section on the line *a b* (Fig. 10). Figs. 13, 14, 15 and 16 are details illustrating the compensating clutch. Figs. 17 and 18 are details of the meal packing fingers and Figs. 19 and 20 are details as to positions of the meal packing fingers. Fig. 21 is the meal carrying frame. Fig. 22 is a perspective view of one of the meal packers. Figs. 23, 24, 25, 26 and 27 are details of the drainage racks. Fig. 28 shows the cylinders of a series of presses all of different sizes and each having an individual pressure sustainer, all controlled through their respective cylinders by a common accumulator. I omit the indicator from these views. Figs. 29 and 30 are details of the belt reversing means. Fig. 31 is the top of one of the compartments forming the compression chambers. Fig. 32 Sheet 5 is a detail of the partition connecting links. Fig. 33 Sheet 5 is a section on line *x x* of Fig. 5. Figs. 34 and 35 Sheet 6 are views of different forms of knives I could use for the lid or top of the compression chamber. Fig. 36 Sheet 6 is a vertical section of a portion of the meal warmer and lid of the compression chamber and showing the action of the wing protecting means for the mechanism. Fig. 37 is a side elevation of the belt shifting mechanism. Fig. 38 is a part diagram. Fig. 39 is a side view of the belt wheels. Fig. 40 is a detail showing the tripping mechanism. Fig. 41 Sheet 6 is a rear view of the pressure sustained. Fig. 42 Sheet 7 is a vertical section through the actuating rods for the time trip.

A is the hydraulic cylinder. B is its foundation rest.

C is the ram.

3 is the platen carried by the ram.

4, 4, 4, 4, are a series of partitions forming compartments in the compression chamber.

1 and 1 are two plates forming the lateral walls of the compression chamber. At their base these plates are expanded in their relation to each other, thus making the chamber downwardly diverging. The purpose of this divergence is to facilitate the discharge of the oil cake after the oil is extracted from the meal.

2, Fig. 4, not shown in Fig. 1, is a steam jacket on the lateral plates. This is for the purpose of heating the plates and thus the chamber by radiation. These plates are made of heavy steel and must be perfectly smooth on their inner face. This will prevent the adhering to their inner sides of any of the meal cake.

F is the top of the chamber or the lid therefor. It consists of an upper and a lower plate bolted or riveted together and steam tight, forming a steam jacket for the top of the chamber. 5 5 are rollers carried by this lid and they serve as its support. 6 is a link connecting the lever 7 with the said lid, Fig. 4. The said lever is fixed to and operated by the shaft 8.

H is the warming chamber for the meal. It is jacketed at the one side with a steam chamber as shown in Fig. 4. At the opposite side it is slotted to permit the play of the arms 11. It will be seen the top of the compression chamber F becomes the bottom of the warming chamber. J is the heater proper and the meal is discharged into the said warming chamber after being heated or cooked in the said heating chamber. The pipe J′ connects the jacket of the heater J with the jacket of the warmer H. The pipe J″ connects the jacket 2 of the compression chamber with the jacket of the heater proper.

U, U are a series of plate supports for a series of meal packers V. There are several of these packers on each plate. Best shown in Figs. 17, 18, 19, and 20. These packers pack the meal tightly in the compartments of the compression chamber, one packer for each compartment. My practice takes the place of the cake formers at present used and I form, so to speak, a series of cakes simultaneously. This packing of the meal insures an even distribution of the meal in the compartments of the compression chamber and therefore an effectual extraction of the oil. As the plate U is raised the packers V, V take the position shown in the dotted lines V′, V′ and the material will pass by them, or they will pass by the material. As they are dropped the packers will spread out and press moderately the meal as shown in Figs. 19 and 20.

Z is the thrust head of the hydraulic press.

D, D are the tension rods.

9, 9 are bolts holding the lateral plates forming the lateral walls of the compression chamber in position against a head former for the chamber 10, Fig. 1 only.

Y, Y are the roller supports for the bottom of the compression chamber. X is a rod on which these rollers are supported and W the oil or liquid collector carried by the bottom.

E is an oil outlet pipe from the collector leading to the common oil pipe F′. The latter of which is the oil conductor of a series of presses, not shown, and leads to the oil reservoir of the oil mill, not shown.

As the plate U, carrying the packers V is raised the arm 11 is also raised. 12 is the shaft which carries the arms 11. The cam 13 of the shaft 131 raises the plate U through the arm 11. Thus the oscillation of the arm 11 packs the compartment of the compression chamber in the manner already described. The pin 15, it will be noted, pivotally holds the packers to the respective plates U.

It is important to have the plates U out of the path of the moving lid F and that they shall operate only when the lid of the chamber is open. This I accomplish as follows: In Figs. 3 and 4 16, 16 are upright arms carrying a cross brace 15′, thereby connecting the two arms 16, Fig. 3. These arms are carried by the shaft 15″. 17 is a link connecting arm 16 with lever 18. There are two of these links in practice and two of these levers 18. 19 is also an arm. These two arms are pivotally supported on the shaft 8. 20 is also a link. 21 a locking bell crank lever carried by the shaft 22.

As shown in the solid drawing in Fig. 4, the packers are raised and the lid is over the top of the compression chamber. It will be seen the link 6 has a slotted end 23 in which slot the stud 24 plays, the latter being fixed to the arm 7. Now as the arm 7 oscillates machineward the link 6 will slip in the slot until the pin 24 contacts with the other extremity of the slot. During this motion of the link the lid is motionless: Thus the angular motion of the arm 7 between the radial lines 26 and 27 operates the lid of the compression chamber: While the arm 7 moves from the radial lines 25 to 26 the arm 19 moves from 28 to 29 and at this same time the link 20 is raised by the lever 19 and the pin 31 of the bell crank 21 is in contact with the lower end of the slot 32′. The lid is now commencing to move and the bell crank 21 is also commencing to move. It will be seen that the arc 32 is of much smaller radius than the arc 33, therefore, a slight movement of the link 20 after contacting, as described, with the pin 31 will oscillate the bell crank 21 sufficient to disengage it from the end of the arm 16 as shown at 16′. The moment this disengagement is accomplished the arm 16 will drop to the position indicated by the dotted line in Fig. 4 and as soon thereafter as the arm 7 has moved the lid from the path of the plates U they will drop down into their respective compartments in the compression chamber, as shown by the dotted line 34′. As the shaft 14, which carries the cam 13 is in continuous rotation it will raise and lower the lever 11 until the chambers are full or until it is thrown out of the line of contact with the periphery of the rotating cams which actuate the levers 11.

In practice the compartments are filled before the lid returns and then the meal will hold them out of the path of the returning lid. It is only necessary to raise the lever 11 a few times and to drop them a like number of times until the compartments and the chamber are filled as tight as good work in oil expressing requires. To prevent the possibility of accident, however, it is necessary to force the levers up independent of the condition of the packed meal in the compartments of the compression chamber. This I accomplish as follows: The link 17 carried by the arm 18 at its upper extremity carries a slotted portion 35. When the levers 16 are in the position indicated by the dotted line 34 the upper portion of this slot 36 is in contact with the pin 37 and the arm 18 is in the position radially relative to the arm 19 indicated by the dotted line 38. But as the arms 7, 19 and 18 are all rigid with the same shaft, as the lid closes the pin 37 is engaged by the link 17 and the arms 16 are raised, and as the bar 15′ which connects these two arms is of course actuated by them and contacts on the under side of the levers 11 the said levers 11 are thus raised and with them the plates U and the packers V, and after they are so raised the bell crank 21 is again oscillated from the position indicated by the dotted line, Fig. 4, where it remains while the arms 16 are down to that position shown in the solid drawing, as shown in Fig. 4. Thus are the levers 11 locked and held up out of the path of the lid F until it is again moved from the top of the compression chamber in the manner hereinbefore described.

It is hardly necessary to say that the packing of the compartments is accomplished while the lever 7 is traversing the angular movement equal to the distance of the slot 23 on its return motion.

At this point and in this connection it may be well to describe how I start the operation of my machine. In Fig. 4 39 is a hand controlled movable plate separating the meal warmer from the meal heater. Of course these two chambers really constitute a heating chamber, but for the purpose of the efficiency in work it is necessary to separate these chambers by the partition 39, for the following reasons: As already stated in this specification seed meal must be hot to extract the oil effectually. The plate 39 holds the meal in the chamber 1 for a period of 30 minutes for cotton seed meal and 50 minutes for flaxseed meal thereby cooking it. The chambers must be brought to the proper temperature to do this. After it is properly cooked I withdraw the plate 39 and allow the meal so cooked to fall into the chamber H. This, as I already explained I term the warming chamber and its temperature is lower than that of the cooking chamber above. I then allow the meal to remain in the warming chamber until a second lot of meal is cooked in the cooking chamber, then the machine is ready for its daily work. While the above cooking and heating are in progress the compression chamber and all the compartments thereof have become heated to the proper degree to facilitate oil flowing and extraction and as the machine starts this chamber 1 by the opening of the lid as described receives the meal thus discharged therein. The meal is carried first to the bin J''', thence to heater $a'$, thence to warmer H from which it is discharged to the compression chamber 1, from which the oil flows to the collector W and pipe E in the direction of the arrow to the oil reservoir. As the chamber is emptied after each pressing the residuum is carried away by belt 39' in the direction of the arrow shown in Fig. 4 to any common receptacle which may await it.

40 is the holder of the lateral plates I which form the walls of the compression chamber and 41 are screws carried thereby receiving the stress on these plates. There can be any number of these holders. They are the same as shown in my former applications, for a like function and I do not show them except in Fig. 4.

K is a shaft.

*r* is a fan carrier arm and S S are a series of meal agitating arms carried by the said arm. These meal agitators are in continuous motion during the operation of the machine. The shaft M carries the gear N and the shaft K the gear L.

P is a fast and O is a loose pulley actuated by the prime shaft of the pressing room, not shown.

After the chamber formed by the lateral plates I, I is filled in the manner hereinbefore described, and the mechanism started the accumulator 42 forces the water through the pipe 43 into the valve chamber 44 and then through the pipe 45' into the chamber 46 of the cylinder A. The valve 47 must be open when the machine is in operation normally, but this valve is controlled by the machine automatically. 48 is also a valve. This valve at the end of a day's operation is closed. I would note that when the valve 48 is open it is equivalent to the operation of the pump, for when the pump stops the pressure ceases, so when this valve is closed the means for producing pressure is not in action. Now as the valve chamber 44 is connected with the small hydraulic chamber 50 by the pipe 160, Fig. 1, the pressure in this chamber is the same as the pressure in the pipe 45' and the same as is the pressure in the cylinder A, therefore, when the pressure is sufficiently great to raise the lever 54, which is carried by the piston 51' of the chamber 50, the valve 47, through the link 67 will be closed closing the pressure at a fixed maximum. This maximum in the machine shown in Fig. 1 is at 3000 pounds pressure per square inch. Simultaneously with this movement the belt from the line shaft of the oil mill, not shown, will be moved from the loose pulley 56 to the fast pulley 57 and this fast pulley will then rotate the worm wheel 58 and through the shaft 69 and pinion 70 the rack 68 will be moved. This is best shown in Figs. 7, 11 and 1. The trip and time indicator 60 is moved by the rack 68 but not carried by it. Therefore the trip is moved toward the lever 46' which it trips whenever the hydraulic cylinder belt is on the pulley 57 and this always happens when the valve 47 is closed.

The manner in which the trip is supported to move with the rack is as follows: 71, 71 are two supports for rods 52 and 53. These rods are fixed to these supports. 72, Figs. 1, 7 and 10, is an arm fixed to the frame of the machine and is the guide for the rod 53 as well as for the carrier 71 and the trip 60, and the rack 68 is part of this fixed combination, it being carried by the part 71, best shown in Figs. 10 and 12. It, therefore, follows that the moving of the rack will move the trip 60. Now when I set my trip to an indicated numeral that indicates that the trip will consume that number of minutes until it moves the lock holding the exhaust port and high pressure is held during this time in the cylinder A. The moment pressure would slack for any cause the piston 51 in the accumulator will drop and, therefore, the weighted lever 54 will also drop and the valve 47 be thereby opened. Now again the pressure from the accumulator will force the pressure in the cylinder A up to the indicated high pressure, *i. e.*, 3000 lbs. per square inch. Whenever the valve 47 is closed and the high maximum pressure is in the cylinder the trip 60 stops because the belt is on the loose pulley and the shaft 59 will not rotate, but whenever the pressure is at maximum the belt is on the fast pulley and the trip and time indicator is moving toward its tripping point, *i. e.* the valve locking lever 46′. While this time recording and pressure sustaining mechanism, as shown in Fig. 1 is shown as interposed between the accumulator 42 and the cylinder A, and, in being so interposed I operate a valve 47 to shut off my means for producing pressure in the cylinder, yet I could employ the same device when I operate directly from a pump to the said cylinder A. In this latter case, however, I would dispense with the valve 47 and merely shift the belt of the pump by substantially the same means I employ in Fig. 1.

I have now described how I sustain the pressure, how I predetermine a time period for sustained maximum pressure and during which period a fall in pressure below the normal maximum will not count against this time period for maximum pressure. The manner in which I adjust my trip for maximum pressure sustaining is as follows: I free the screw 74 from its rod 53, this releases the trip 60, and then I slide the trip to the desired time indicated by the indicator plate 51. This I can vary from 1 to 15 minutes on the indicator as shown in Fig. 7 and 1 to 18 minutes as shown in Fig. 1 and whenever I stop my trip and fix it to the rod 53 by the screw 74 the time so indicated is the period for sustaining maximum pressure.

When presses are actuated from an accumulator the pressure is high and constant and greater than the desired maximum. Therefore, before I exhaust the water from the hydraulic cylinder it is necessary to keep the valve 47 closed and not to open it until the lid of the compression chamber is opened and about closed. The reason for this is obvious. For otherwise the accumulator would discharge its reserve pressure, or the water which gives it its reserve pressure, directly through the exhaust port. This condition does not, however, exist where the pump pumps directly into the cylinder of the press. Because the action of the pump would merely throw the water it actuates at each pulsation through the said exhaust port with little waste of energy. I accomplish the above desired result as follows: 67 is a link pivoted to the weighted lever 54. This lever, as explained, controls the valve 47. Now the lever 54 is liable to oscillate and open and close the valve 47 by the means already described, thereby feeding water to the cylinder A, when pressure drops and it will close it off when pressure is up. It will do this during the period of high pressure sustaining if there is any leak in any part of the connections, and it is rare that there is not some leaking in high pressure hydraulic devices. But when the period of high pressure, as predetermined by the indicator 60, has expired and this trip 60 contacts with the lever 46′ and oscillates it to the position shown by the dotted line 176, Fig. 7, the weight 62, through the chain 77, will swing the valve operating disk 45 to the position shown by the circumferential line 78, Fig. 7; and as the valve 79, shown in section, Fig. 8, is carried by the disk 45 it will be moved 90° and the port 80 will thus be opened. This will allow the water to flow from the chamber A. It is evident that the trip 60 will only move when the pressure is at maximum, because it can only move when the rack is moving and the rack 68 can only move when the belt shifter 55 holds the belt on the fast pulley 57. Therefore the valve 47 is always closed when the belt is on the fast pulley. Now as the weight indicating arm 65 is raised by the accumulator piston 57′ through the pin 81 on the said arm and is held up only at maximum pressure, the instant the exhaust port 80 is open it would drop and thus permit the water in the accumulator to be discharged. I prevent this by the following means: shown only in Fig. 1. 82 is a bell crank lever cam shaped and adapted to swing in the vertical oscillating path of the weighted lever 65. 83 is a chain carried by the disk locking lever 46′ and instantly the said lever is oscillated the said cam is thrown into a vertical position and in the path of the lever 65 and the said lever 65 cannot now drop.

The dotted line $82^2$, Fig. 1, shows the locking position of this locking lever. This keeps the valve 47 closed because the lever 54 cannot drop and the link 67 cannot perform its valve unlocking functions. The parts remain in this position until the compression chamber is emptied, trays cleaned and the compression chamber filled again, after which, as the lid F is closed, it operates the lever 84, Fig. 1, and through the chain or link 85 returns the bell crank 82 to its normal position, permitting the levers 65 and 54 to return to their normal positions, thus opening the valve 47 and permitting the water to flow from the accumulator 42 to the cylinder A in the manner hereinbefore described. Simultaneously with the unlocking of the bell crank 82 the disk 45 is reseated back to normal by the link 86 connected with the lever 84 at the one end and with one of the arms of the said disk at the other. The exhaust port 80 is thus closed and the valve 79 reseated. This is best shown in Figs. 1, 7 and 8. The pressure is now again on the cylinder A. The dotted lines 87 and 88 represent the oscillated position of the arm 84, Fig. 1, and in this movement the links 86 and 85 reseat their respective parts 45 and 82 for the purposes stated respectively. The specific attachments for these reseating functions are not material. I could operate them from other parts of the machine for actuating the lid or otherwise. I place no specific limitations on mechanism for this work.

I have now described how I heat my meal, keep it warm in the supplemental warmer, pack in into the compartments of the compression chamber; how I start the compression, how I predetermine the pressure, how I hold the pressure at a predetermined maximum regardless of falling pressure by possible leakage of connections, how the water is automatically exhausted, how the accumulator is locked against feeding water to, or wasting it through the exhaust port and how the mechanism is automatically thrown into operation at conclusion of the filling of the compression chamber.

I will now describe how I disengage the rack 68 from the action of the fast pulley the moment the water is exhausted as described. This is bent shown in Figs. 7 and 42, also 1. 69 is a shaft fixed to the worm gear. 49′ is a clutch having an annular channel 89 in which is carried a clutch actuating pin 48′. 90 is a secondary shaft supported on a bearing 91 at its lower end and at its upper end held to the clutch member 49′ which has a hole forming a bearing therefor. 93 is a hole in the clutch jaw 94 and 92 is a pin carried by the clutch 49′ which locks in the hole aforesaid. There can be a number of these holes. 95 is a pin carried by the disk 45 and 61 is a lever supported on a fixed part 96. As the disk 45 is thrown by the weight 62 after being unlocked by the trip 60 contacting with the bell crank disk retainer 46′, the pin 95, being rigid with the disk 45 will oscillate 90° in the arc shown at 98, Fig. 7. This will oscillate the arm 61 from the radial line 99 to the radial line 100 and the rod 97 will be raised from line 102 to the line 101, Fig. 7. Now as the lug 48 is carried by this rod and the said lug engages with the annular channel in the clutch 49′ the clutch jaw will be immediately disengaged from the jaw 94 by withdrawing the pin 92 from the hole 93. The shaft 90 will then stop regardless of the continued motion of the shaft 69 and as the pinion 70 is fixed to the shaft 90 and rack 68, which actuates trip 60 is operated by the said pinion this trip will stop. In Fig. 7 I show a sectional view of a lug 103 carried by the stop 60 on its arm 47′. This trip is on the horizontal plane of the angular lug 105 of the disk 45 and will force the unseating of the valve 79, thus insuring the opening of the port 80.

I will now describe the compression chamber and the manner of cleaning the same.

Figs. 5 and 6 are respectively a plan and a side view of the compression chamber. 4, 4, 4, 4, 4 are a series of drainage racks and compartment partitions of this chamber. These racks are subject to heavy lateral pressure, as much as 2000 pounds per square inch at times. It is necessary that the drainage elements should remain intact during this enormous pressure. I therefore construct the racks in the following manner. Fig. 24, 106 is a heavy mesh wire cloth. This forms the oil conducting or drainage element of the partition. As shown in Fig. 23 this member is in the center of the rack. 107, Fig. 25, is a perforated metallic sheet. It could be made of steel, copper or flexible vulcanized fiber. The perforations are about $\frac{1}{8}$ of an inch in diameter. Fig. 26 shows a very fine woven wire cloth, as fine as the finest camels hair cloth. 27 is a very heavy cotton fabric about $\frac{1}{4}$ of an inch in thickness. This is the percolating element of the combination. Fig. 23 shows the manner of combining these elements into the complete drainage member. 106 is in the center. Next on either side are the plates described 107. On the outer side of these plates there are the fine wire sieves 108. On the outer side of these plates is the percolating cloth 109: they are all bound by clamps 110, shown in section in Fig. 23. These parts are all held to a top metallic strip shown in Fig. 31. In Fig. 5 I do not show the elements of the compartments as space forbids, likewise in Fig. 6.

We will now assume that the compression chamber has all its compartments filled and the lid of the chamber is closed. The platen 3 is then forced up as already described. Each of the racks carries a top cap or plate 112, Fig. 31 only. 111 is a lug one each of the racks. These lugs carry links, cam shaped links 113. These links while the chamber is filling are taut, as shown in Figs. 5 and 6, but as the pressure of the platen 3 forces the chambers together the distance between the racks becomes smaller and smaller and the cam links gradually intertwine and contract their centers as shown in Fig. 32 until the predetermined limit of pressure is reached. When this is accomplished the exhaust port 80 is opened through the valve 79 on the disk 45, and the weight 87′ through the chain 88′ will pull back the platen 3.

114 is a cam faced angle plate carried by the platen.

115 is a sliding bar, or cross bar having spring retaining lugs 123 and 123 on either side. These springs are four in number, one for each corner of the end compartment contacting with the platen.

117, 117 are two lugs cam shaped on their platen end. The bar 115 is also cam shaped on its end or wall facing these lugs.

116, 116 are lateral bars extending the width of the compression chamber. They are connected at their platen end with the bars 117. There are two of these bars 117, one on the upper and one on the lower side of the ram. These bars have cam shaped recesses at their platen end and into these recesses the sliding bar 115 fits. At the other end these four bars are all held to the compartment which rests against the head of the compression chamber 10. Now as the platen is forced back after pressure has been up to maximum the angular member 114 will engage the sliding bar 115 and force it into the aforenamed cam shaped recess of the bars 116 and the angle plate 114 will then pass over it and lock it in these notches. The springs 124 are of such strength that they will pull the compartments with but little yielding in their or during their reciprocating movements. So when the bar 115 is locked to the four bars 116 I have a rigid frame with the drainage compartment 4′′ at one end and forming the end thereof and the drainage member 4′′′ at the other and forming the opposite end thereof. The series of cam links already named 113, 113, 113, 113, connecting these two ends and on these links are suspended the drainage partitions 4, 4, 4, 4, with all their elements as already described. The two ends, it will be remembered, are supported on the bars 116. These partitions fit snugly the lateral walls, the top and the bottom of the compression chamber and to clean them from residuum I reciprocate them longitudinally in the compression chamber. The trays or drainage partitions are thus all locked to the four bars 116, 116, 116, 116, and thus as the cross bar 126 is a link connecting the arm 119 of the bell crank lever with the rod 129 and the latter rod is operated by the eccentric 130, shown only in Fig. 3. This eccentric is carried by the shaft 131 and this shaft is rotated fast or slow depending upon the gear with which the clutches 135 or 135′ is in operative contact. The clutch 135′ operates gear 132 for the slow reciprocation of the racks and the clutch 135 operates the gear 133 for the fast reciprocation of the said racks. These gears are the prime movers for the clutches as shown in Fig. 1 and Figs. 3 and 2. In Fig. 2 I show the gears by dotted pitch diameters. The gear 132 is actuated by the gear 134 for slow speed for shaft 131. The gear 133 actuates gear 135 for high speed for shaft 131. The clutches are so adjusted and the machine so timed that the slow speed is in action when the trays are first moved and after a limited motion at this speed the cam 136 throws the clutch into the high speed, which reciprocates the racks rapidly. The reciprocation of the racks takes place while the lid of the chamber is closed and the bottom is open.

137 is a clutch operating arm and 138 a crank carried by shaft 141. 139 is a link operating lever 140 and 142 is an arm carrying link 143 for operating oil collector W. 145 is a shaft carrying crank 144 and 146 is a link connecting this shaft with crank arm 147 and 147 is carried by shaft 148. In practice I prefer two arms 7 and two arms 142, as shown in Fig. 3, though but one is shown in the drawings. These parts are all old and are shown in my applications hereinbefore referred to. The means for engaging the clutches on the return of the platen is also old being shown in the same applications and I do not therefore deem it of importance to give such a full and detail description here, as otherwise would be necessary. Suffice it to say that as the platen returns it strikes the lever 162, Fig. 3, and the link 163, through the friction roller 164 forces the clutch 165 in engagement with the clutch 166, whereupon the shaft 141 is rotated. The rotation of this shaft opens and closes the bottom of the compression chamber W. The elements engaged to do this are the crank 138, the link 139, crank 140, shaft 159, arm 142 and link 143. As the shaft 141 makes one complete rotation the rod 167, shown only in dotted line, Fig. 3, engages the end of the arm 163 and oscillates it to disengagement from its lock, not shown because old as above. Then the spring 168 forces the clutches 166 and 165 apart and the arm 169 forces the clutches 170 and 171 together, thereupon the shaft 145 is actuated by the gear 157 and also the gear 158 and the operation of this shaft rotates crank 144, which through link 146, Fig. 2, operates lever 147 shaft 148, arms 18 and 19, lever 7 and link 6 all for the purposes already fully described. After a complete rotation of the shaft 145 and a return of all these elements to their respective normal positions the clutch jaws 170 and 171 are unlocked and the mechanism comes to rest. The unlocking of these elements is old in the applications hereinbefore referred to.

In Fig. 28 I show a series of hydraulic cylinders A′, A′′, A′′′ operated by a common accumulator. This arrangement of presses would be used where a common accumulator feeds water to presses instead of an individual pump for each press. The object is to vary the pressure in the presses automatically regardless of the pressure in the accumulator. The pressure when varied is to be considered at maximum. In the time recorder and pressure sustaining device I only show the exhaust valve disk 45 and trips and the pipe connections with weights for opening these valves in Fig. 28 as the other features are fully illustrated in Figs.

1, 7, 9, 10 and 11 and considering the lack of ample space on the sheet a repetition of the other elements is deemed needless.

42 is an accumulator receiving water from the pump 180 through the pipe 49.

A''' is a small hydraulic cylinder, A'' is a large hydraulic cylinder and A' is an intermediate cylinder. Now the pressure in pipes 175, 177 and 178 is uniform but the pressure in all the cylinders at the same time is liable to vary and will vary where they are not the same size, allowing that they receive water from the same accumulator. If I desire to predetermine my maximum at a different degree of pressure I can do so entirely independent of the pressure in the pipe 175. This is a very essential feature in an automatic oil mill. In fact no matter how many presses are in operation from the same accumulator this feature insures the entire oil mill being entirely automatic. If for any reason I wished to have the time on some of the presses short at high pressure and others long sustained the individuality of all the presses of the series, and their absolute independence, each of all the others, will enable me to do this.

182 is an outlet pipe from the cylinder A' leading to the exhaust chamber 183.

184 is an outlet from the exhaust chamber leading to the hydraulic accumulator 185. This accumulator performs the same function as does the accumulator 50, Figs. 1 and 11 and it is in fact the same accumulator differing only in position. The numbers, as designating these elements, are changed as a matter of convenience in description. They are to be considered as one and the same elements. There is no difference in any of the co-acting elements of these chambers.

186 is a weight to reseat the ram 187 after the exhaust disk 45 has opened the valve as shown in Fig. 8.

190 is a valve operated by the ram 187 through the link 191. When pressure is applied and is up at maximum the arm indicated by the dotted line 189 will have moved to dotted line 188. This closes the water off of the chamber A'. If leakage should occur the pressure would sink below normal and the weight 186 will open valve 190 and keep it open until the pressure is again forced up as described. This mechanism is substantially the same as shown in Fig. 1.

It will be apparent that the pressure in any one of the series of cylinders, A', A'', A''', is not up to maximum, as predeterminable by the means shown in Figs. 7 and 1, until the pressure in the chambers 183, 183', 183'' is up to this predetermined maximum. And this chamber 183, it will be remembered, is the same as chamber 44, the exhaust chamber. Therefore, as soon as the pressure is at maximum the valve 190, as indicated in Fig. 28, which, be it remembered, is the same as valve 47, shown in Fig. 1, will be closed. On fall of pressure below the predetermined maximum it will be opened, as I have already described. Therefore I control the pressure in the cylinders entirely independently but each through its individual cylinder. The pump 180 keeps the accumulator up and the accumulator, through the conductors 175, 178 and 176 177 feeding the water or liquid to the different cylinders, and the cylinders through conductors respectively 181, 179 and 182 feeding the exhaust ports in chambers 183'' 183' 183, Fig. 28, and the exhaust chamber feeding the accumulator 185, and the ram 187 of this accumulator controlling the valve 190 through the link 191. The weight 194 is shown as a means to open the exhaust ports after unlocking, as already described, and as illustrated in Figs. 1 and 7 and other views.

Fig. 9 shows a modified way of connecting the valve actuating means with the accumulator 50. The link 67 swings the valve lever 198 from line 199 to line 200 as the arm 54 is raised to line 197; meanwhile the integral arm 201 will be oscillated from line 195 to line 196. The function of this modified mechanism is the same as that shown in Figs. 1 and 28.

I desire it distinctly understood that I consider the accumulator 42 as the full equivalent of the pump 180 and that the closing and the opening of the valve 190, Fig. 28 or 47 Fig. 1, is the equivalent of the shifting of the belt from the fast to the loose pulley of a pump. In each case I start or arrest increasing pressure in the compression chamber, and specific modifications to this end are not at all material.

Figs. 29 and 30 also Fig. 1, show an automatic belt shifting device. *a'* and *a''''* are two tight pulleys carried by the prime shaft 15'' of the machine. They are operated directly by the line shaft of the pressing room, not shown. The bell crank lever $200^2$, through the link $201^2$ actuates the belt shifting fingers 205 and 206. 207 is a cam. 208 is a cam faced bar. The cam 207 is provided with a means to pivotally support it to the shifter 204. A stop 210 prevents the cam from falling from its normal position as shown in Fig. 30. 211' is a stop lug carried by guiding rods therefor 212' and 213, controlled by springs 214' and 215. This lug carries the belt actuating fingers C' and C''. The object of the mechanism described is to reverse the shaft 15'' in order to relieve the contact clutch pins *b''* and *b'''* from the enormous friction existing by their contact and thus to insure that the spring 168 will force the said clutch jaws apart. This occurs in the shifting of the power from the bottom actuating mechanism to the top or lid actuating mechanism through the shifting of the belt which I accomplish as follows: The arm 200 is raised by the spur gear 158 and immediately on so being raised the link 201 moves the belt moving finger 205 from the wheel $a''''$ to the wheel $a'''$ shifting the belt held by the fingers from the fast pulley $a''''$ to the loose pulley $a'''$. This will rotate the prime shaft of the machine 15″ in its normal direction for work, but while this movement is in progress, and near its inception, the part 211′ engages the stop therefor 216 and arrests its motion, the supporting rods 212 and 213 slide thereafter in their guides compressing the springs 214′ and 215, thereby storing energy to shift the belt controlled by the fingers C′ and C″ as soon as the cam 207 contacts with the cam face 208, the effect of which contact is to raise the part 211′ and thus disengage it from the stop 216. Immediately on the part just described being so raised the springs aforesaid will be free to exert the energy their compressed condition gives them and the finger C″ will, by virtue of this energy exerted, force the belt from wheel $a''$ to wheel $a'$, thus reversing the prime shaft 15″. It will be seen that the part 211′, Figs. 29 and 30 rests on the cam arm 207 and thus moves up with the said arm. It will also be seen that the head of the said cam arm hooks around the said finger carrying arm or part 211′ and thus the return of the belt shifter 204 to normal also returns the fingers C′ and C″ to normal. The arms $e$, $e$ are the supports and guides for the spring controlled rods 212′ and 213 and they are carried by the cam piece 207.

I have described how I shift the belt from the normal rotating to the reverse rotating pulley, for the pulley $a''$, it will be understood, carries a twisted belt and this belt is normally on the loose pulley. The shifting of the belt to the fast pulley is but for a moment, as the instant the pins $b''$ and $b'''$ are frictionally released the spring 168, Fig. 3, disengages the said clutches. I will now describe how the belt shifter is actuated and how the same is reseated. The gear 155 is fixed to the shaft 14 as already described, and the clutch 165 is splined to this shaft, as also explained. The clutch pin holder 212 of the shaft 141 is normally disengaged from the clutch pin holder 166: Therefore, the shaft 141 can rotate only when the pins $b''$ and $b'''$ are engaged with the pins carried by the parts 212, or pins $b''''$ and $b'''''$. After the platen has engaged the pins aforenamed carried by the pin holders 212 and 166 through the lever 162 and link 163, Fig. 3 only, the pins aforenamed become locked together or are held in the same vertical rotary plane. Now as the shaft 14 and the gear 155 rotate the shaft also rotates.

225 is a lever pivoted at 226, Fig. 37. This lever carries a cam faced projection 227 and this projection is in the rotary path of the pawl or dog 228, best shown in Fig. 38. Now as the said dog strikes the said cam of the said lever 225 the lever is oscillated from the position shown in the solid drawing, Fig. 37, to the dotted line 229. The oscillation of this lever will move the lever 200 from the position shown in the solid drawing, Fig. 37, to the position shown by the dotted line 230. This will slide the arm 202, which carries the belt shifter support 204 from the line 231 to the line 232, Fig. 37, and move the belt from the wheel $a''''$ to the wheel $a'''$; and also, in the manner already described, and as shown in Fig. 30, the belt from the loose pulley $a''$ to the fast pulley $a'$. Now by consulting Fig. 39 the belt 233, which is the belt on wheel $a''$, is a twisted belt, as already hereinbefore stated, and gives to this pulley, therefore, a reverse motion to that given by the belt 234, which is the belt carried by the wheel $a''''$. Now as the shaft 15″, which carries the wheels $a''''$, $a'''$, $a''$ and $a'$ is the prime shaft of the machine, and all the other elements are controlled by its motion, the effect of this reverse motion is to free the pins $b''$ and $b'''$ from the pins $b''''$ and $b'''''$ and immediately the spring 168 will force the pin holders 212 and 166 apart, as already referred to, and after so forcing them apart it will also force the clutch gear 157 in engagement with the clutch pin holder 170. Now the gear 157 is mounted loosely on the shaft 14 and rotates, therefore, independent of the rotary motion of the shaft and the clutch pin holder, it will be remembered is keyed to the said shaft 14 therefore the gear 157 will rotate in its now shaft locked position. The rotation of this gear rotates the gear 158 and this gear operates the compression chamber lid F, as already described. 236 is a stud or pin carried by the gear 158.

The manner of unlocking the clutch pin holders 170 and 157 is as follows: as the gear 158, nears the end of its rotation, it strikes the pawl 237 of the arm 238 integral with the arm 200. It will then oscillate this arm from the position shown in the solid drawing, Fig. 37, to that indicated by the dotted line 239 and the effect of this oscillation will be the same as that formerly described: *i. e.* to move the arm 203 carrying the belt shifter 204 from the line 231 to the line 232 and the belts 233 and 234 will act as before reversing the belt wheel with the reverse or twisted belt and so changing the rotation of the shaft 15″ and freeing pins 171 from pins 240.

241 is a locking dog for the clutch and as the spring 168 forces the jaw up the said dog will snap into the position shown in Fig. 40 and hold the said pins in engagement until the said dog releases its contact. This I accomplish as follows: 249 is a link, Figs. 37 and 40, as the arm 200 is oscillated in the manner already described this link, which is fixed to the arm 200′ at the one end and to the lock 241, Fig. 40, at the other the said lock will also be oscillated in disengagement from the flange 242 of the clutch and the spring $t$ will return the said clutch to its normal position; as it so returns the trip $t''$ will strike the dog $t'''$ and swing the dog 237 in the position indicated by the line $t''''$. This will unlock the arm 238 from the said pin and the spring $p$ will through the link $201^2$, pivot $t'''''$ force the arms $200^2$ 200′ and 238, all integral, back to their normal position as shown in Fig. 37, and thus reseating the entire belt shifting mechanism. The slot $X^2$ of the link $X^3$ permits of the cam carrying arm 225 being operated independent of the levers 200, 200′ and 238.

$f'$ is a spring fixed to the arm 238 and the spring supporting pin $f''$ holds it thereto. This spring reseats the pawl 237 as follows: 250 is a sliding bar. I do not show the supports for this bar. This bar carries a tripping projection, upwardly extending $t''$, Figs. 37 and 40. The bar has two ears or lugs O″ and O‴, Fig. 40 only. These lugs engage with the annular flange 242 of the clutch pin holder 170. Now as the clutch lock 241 is oscillated by the link 249 on the shifting of the belt 233 from the pulley $a''$ to the pulley $a'$ and the arm 250 is forced together with the annular flanges 242 in the direction of the arrow $S^4$, Figs. 3, 10 and 37, it follows that the projections named of the said bar 250 will contact with the dog 237 and the said dog will be oscillated from the position shown in the solid drawing, Fig. 40, to that shown in the dotted line $t''''$. This oscillation will throw the pawl 237 out of the path of the pin 236 and the gear 158 and spring $p$ will be free to exert its energy in reseating the arms 200 and 238 and all elements connected therewith. That is to say it will oscillate this arm from the position indicated by the dotted line 239, where it was carried by the gear 158 before the shifting of the belt, and as already fully described, stopped the rotation of the said gear. The dotted line $S^{10}$ shows the path of the end of the trip $t''$ and indicates the degree of oscillation it gives to the pawl $t'''$, and the dog 237. The dotted line $S''$ shows the radial swing of the pawl $t'''$ in its dog tripping function. The dog or pawl $t'''$ is carried by the dog 237 and the latter being pivoted to the arm 238 the pivotal center of this arm becomes the center of the orbit described by the movement of the extreme point of the pawl $t'''$ in the unlocking movement of the arm 250. When the pawl $t'''$, however, swings in the opposite direction it oscillates on its own pivot and it has thus a corresponding shorter radial orbit for the same contact or extreme point, as the pawl $t'''$ is carried by the dog 237. I omit the details of this belt reversing mechanism from Fig. 3 as the drawing would be so much complicated but show the rear view of it on Fig. 1, which view is to be considered as embracing all the elements of the machine.

In Fig. 36 I show an enlarged view of how I protect the mechanism from breaking should an object get into the material accidentally, that might arrest the moving of the lid. 204′ is a swinging gate pivoted to the side 205′ of the warming chamber of the machine H. A stone 210′ is shown in Fig. 36 as being in the path of the knife 206′ and the swinging door 204′ is oscillated to the position indicated by 208′ or out of its normal position with no impediment to the moving of the knife 206′ or the lid F which carries it. The door is also shown in Fig. 4 but not the stone.

Figs. 34 and 35 are knives. Fig. 34, 207 shows a serrated edge for the knife and Fig. 35, 206′ a straight edge. Other shapes of knives could be used. I do not limit myself in this regard and as hereinbefore referred to I could use a reciprocating knife for certain functions with guards, such as are in use in the reaper and mower arts. I would use these latter knives in such material as fish, meat scraps and city garbage.

Figs. 13, 14, 15 and 16 show details of my compensating clutch mechanism to insure the locking of the clutch after the bottom is opened and closed, lid opened and closed, chamber filled, platen pumped up and returned and clutch pins $b'''$ moved to engage pin $b''$. Fig. 3 shows how the clutch is moved where the hereinbefore named lever 162 is oscillated by the platen 3 to the position indicated by the dotted line O. This movement of the said lever is accomplished by the weight 87′ through the chain 88′ fixed to the platen 3, Fig. 1 only. As the platen moves the link 163 and the friction roller 164 the pins $b''$ and $b'''$ of their respective clutches become engaged. The crank 138 then rotates through the shaft 141 thus becoming locked to 14. But it may happen that the pins $b''$ and $b'''$ as they are moved by the lever 162 by the means or connections already described may contact at their points which would prevent their engaging clutch like, as well as prevent the full return of the platen 3, and thus also prevent the locking of the shaft 141 with the shaft 14, Figs. 2 and 3. To obviate this I provide the compensating clutch which I now describe. 14 is a shaft, 141 a longitudinal extension of this shaft these two shafts have their central contact ends at $m$. 211 is a sliding tubular member. 212 carries pins $b''''$ and $b'''''$, Figs. 16 and 3.

$n'$ and $n^2$ are the two longitudinal border walls of a key way in the part 211 and $n'''$ is a key fixed and rigid with the shaft 14. $r^2$ and $r^3$ screws compensating springs $r^4$ and $r^5$. These springs contact with the key $n'''$, or I could insert a plug $r^6$, as shown in Fig. 14, between the spring and key $n'''$. These springs are of equal power and, therefore, press equally on the key.

We will now assume that $C^4$ in Fig. 13 is a diagram representing the position of the pins $b''$ and $b'''$ of the clutch 214′, Figs. 3 16, and we will also assume in the same diagram that the dotted circles $C^2$ and $C^3$ represent the possible position of the pins $b''''$ and $b'''''$. Therefore, as the clutch 211 moves forward on the shaft 14 the pins $b''''$ and $b'''''$ in case they should contact with the points of the pins, or strike the longitudinal path of the pins $b''$ and $b'''$ they will oscillate to either the right or the left side of the said latter pins, or into the position shown by either the dotted circle $C^2$ or $C^3$, depending on which side of the stationary clutch pin the initial contact is made by the moving one. Thus either the spring $r^4$ or $r^5$ will be compressed and the clutch 211 will oscillate to a corresponding degree and by this means insuring the moving of the clutch 211 to its locking position as predetermined by the movement of the lever 162 to its dotted line O, Fig. 3.

I do not limit myself to the specific features set out in any of the elements. There are many ways, many mechanical modifications I could make in the different elements for performing the different functions of my invention. These different ways I could employ without departing from the spirit of my invention.

Having now described my invention what I claim as new and desire to secure by Letters Patent is:

1. The combination in a liquid extracting press for oil of a compression chamber, a series of partitions forming compartments in said chamber, a meal heater common to all of the said compartments, said heater located above the compression chamber thus permitting the contents of the heater to pass to the compartments of the compression chamber by gravity and whereby the heater is common to all of the said compartments of the said compression chamber, as and for the purpose set out.

2. The combination in an automatic oil mill of a compression chamber, a series of partitions forming a series of compartments in said chamber, a meal heater common to all of the said compartments and located directly above them, means for opening and closing the said chamber at predetermined time intervals and means for feeding the meal to the said chamber and the compartments by gravity directly from the heater during chamber opening thereof and means for packing the meal in the compartments of the said chamber at the period of its being opened.

3. The combination in an automatic oil mill of a compression chamber, a series of partitions in the said chamber forming thereby a series of compartments, a meal heater said heater common to all the compartments of the said chamber and located above them and means for feeding the heated meal from the heater to all the compartments supplemental means for packing the meal into the compartments of the said chamber at predetermined time periods.

4. The combination in an automatic oil mill of a meal retaining hopper, a meal heater, means for feeding the meal automatically from the hopper to the heater, a series of compression chambers means for heating the said chambers and means for feeding the heated meal from the heater to the said compression chambers, and means for packing the meal in the said chambers.

5. The combination in an automatic oil mill of a series of compression chambers, a series of meal packers for the said chambers, one for each chamber, a steam jacketed top for said chambers common to all, a steam jacketed heater over the said chambers whereby the top of the said chambers becomes the bottom of the said heater and means for producing pressure in the said chambers, as and for the purpose set out.

6. The combination in an automatic oil mill of a series of compression chambers, a meal heater above the said chambers means to heat the said chambers, means for passing the heated meal from the heater to the said chambers simultaneously, means for discharging the said chambers simultaneously of the meal cake and means for cleaning the walls of the said chambers automatically.

7. The combination in an automatic oil mill of a compression chamber, automatic means for filling said chamber, automatic means for discharging the residuum from the said chamber, means for heating the said chamber independent of the heated meal, means controlled by a moving part of the machine to discharge the contents of the said chamber and means for producing pressure in the said chamber.

8. The combination in a liquid extracting press for oils of a heater, a steam jacket on said heater a compression chamber, means for heating the chamber independent of the heated meal, a series of drainage partitions in the said chamber, said partitions having oil straining outer walls and drainage portions between the said walls, means for automatically feeding the heater with raw meal, a top for the said chamber, the said top forming the bottom for the heater, means for producing compression in the said chamber, and means for packing the meal in the said chambers whereby as the chamber is filled the heater discharges the meal it contains and receives a fresh supply of green or fresh meal, as and for the purpose set out.

9. The combination in an automatic press with a top, means to move the top, a compression chamber, means for producing compressive action in the said chamber, a series of partitions in the said chamber forming thereby a series of compartments, a yielding wing whereby the action of the said top will cause the said wing to yield should it be necessary for the normal closing of the lid.

10. The combination in an automatic oil mill of a meal heater, a hopper or meal supply for the heater, means for feeding the meal to the heater automatically, a pressing chamber, means for heating the said chamber independent of the heated meal, means for producing compressive action in the said chamber, a movable wall forming one portion of the heater, said wall forming a partition between the heater and the said chamber and means for automatically moving the said wall.

11. The combination in an automatic oil mill of a compression chamber, a meal supply chamber, a meal heater, a series of partitions forming a series of compartments in the said chamber, means for feeding the heated meal directly from the heater into the said compartments automatically, means for producing pressure in the said chamber and means for starting the pressure automatically, as and for the purpose set forth.

12. The combination in an automatic oil mill of a compression chamber, a meal heater, a series of partitions forming a series of compartments in the said chamber, means for producing pressure in the said chamber, means for automatically feeding the meal from the heater to the compartments of the said chamber, means for automatically starting the pressure and means for arresting the pressure automatically, as and for the purpose set forth.

13. The combination in an automatic press for oil extraction of a meal heater, a compression chamber, a series of compartments in the said chamber, means for producing pressure in the said compartments, means for automatically starting the pressure, means for automatically arresting the pressure and means for predetermining a maximum pressure in the said chamber, as and for the purpose set forth.

14. The combination in an automatic press for the extraction of oil of a meal heater, a compression chamber, a series of partitions forming a series compartments in the said chamber, means for producing pressure in the said chamber, means for heating the said chamber, means for predetermining a maximum pressure, means for predetermining a time period for maximum pressure sustaining as and for the purpose set forth.

15. The combination in an automatic oil press of a compression chamber, a meal heater, means for feeding the meal from the heater to the chamber automatically, means for automatically supplying the heater with meal, means for heating the said compression chamber, means for predetermining a maximum pressure, means for predetermining a time period for maximum pressure sustaining and means for arresting the maximum pressure at the expiration of the said time period.

16. The combination in an automatic oil press of a compression chamber, means for heating the said chamber, means for producing compression in the said chamber, means for predetermining a maximum pressure in the said chamber, whereby at the reaching of the maximum pressure the pressing means will cease.

17. The combination in an automatic oil press of a compression chamber, a series of meal chambers in the said chamber, a common meal heater for the said chambers, means for producing compression in the said chamber, means for predetermining a fixed maximum in the said chamber, means for holding the said maximum for varying time periods, means for automatically withdrawing the pressure at the expiration of the said period, means for automatically filling the said chamber and means for automatically emptying the said chamber, as set out.

18. The combination in an automatic hydraulic press of a means for sustaining pressure at a fixed maximum in the cylinder of the press, consisting of a pump, automatic means to stop the action of the pump at a predetermined pressure, automatic means for withdrawing pressure at a fixed maximum.

19. The combination in an automatic press of a compression chamber, means for producing pressure in the said chamber, means for predetermining a maximum pressure in the said chamber, automatic means for holding the pressure in the said chamber for a predetermined time, whereby while the pressure is at maximum, as predetermined the means for producing pressure is arrested, but instantly on the pressure dropping below normal maximum the pressure producing means is actuated, as and for the purpose set out.

20. The combination in an automatic press of a compression chamber, means for producing pressure in the said chamber from zero to a predetermined maximum, means for sustaining the pressure at this maximum for a predetermined time period, means for automatically opening the said chamber at the expiration of this period and means for feeding the meal to the said chamber while open with means for packing the meal into the said chamber when so fed thereto.

21. The combination in an automatic press of a compression chamber, a cylinder, a pump, means for predetermining a fixed high pressure, means for predetermining a time period for fixed high pressure, means controlled by the pump for arresting the action of the pump at the said predetermined pressure, means for starting the action of the pump on the fall of pressure before the expiration of the said predetermined time, whereby the pressure is forced to maximum and should it fall below maximum before the expiration of the time limit for high pressure at maximum the pump will be started and the pressure again forced to maximum, as and for the purpose stated.

22. The combination in an automatic press of a compression chamber, a cylinder, a pump means for predetermining a fixed high pressure, means for predetermining a time period for maximum pressure sustaining, means controlled by the pump for controlling the action of the pump and arresting such action on the said maximum pressure being reached, means for stopping the pump at this high pressure, means for starting the pump if pressure falls and means for unlocking the pressure at the expiration of said predetermined time limit.

23. The combination in an automatic press of a compression chamber, a cylinder, a pump, means for predetermining a maximum pressure at which pressure shall be arrested, means for variably predetermining a period for high pressure sustaining, means for throwing the pump out of action during the period of maximum pressure, means for throwing the pump into action when pressure drops below maximum, the said means operating between the period of initial high pressure sustaining and the time period predetermined for the arrest of maximum pressure, as and for the purpose set forth.

24. The combination in an automatic press of a compression chamber, a cylinder, means for producing pressure in the said cylinder from zero to a fixed maximum, means for predetermining a time period for maximum pressure sustaining and automatic means for holding the pressure at maximum for the said time period.

25. The combination in an automatic oil mill of a compression chamber, means for producing pressure therein, a cylinder in which said means exerts its energy, a pressure controller, a liquid conductor from the cylinder to the said pressure controller, whereby the pressure is exerted in the cylinder and the said conductor conveys the pressure to the controller, as and for the purpose set forth.

26. The combination in an automatic oil mill of a hydraulic pressure producing means, a hydraulic cylinder, a conductor from the said pressure producing means to the said cylinder, a pressure controller, a supplemental conductor leading from said cylinder to said controller, whereby the pressure in the cylinder controls the action of the said controller.

27. The combination in an automatic press of a compression chamber, a cylinder, a ram, means for producing hydraulic pressure in the said cylinder, a pressure controller controlled by the pressure in the said cylinder, whereby as the pressure reaches a fixed maximum the said controller will arrest the pressure producing means, as and for the purpose set out.

28. The combination in an automatic oil mill of a series of automatic presses having automatic means to feed the presses, a series of metal heaters for each press, automatic means to discharge the presses, a series of indicators for maximum pressure sustaining, a series of means to predetermine the maximum pressure desired, one for each press and a series of independent means to arrest the pressure, one for each press as and for the purpose set out.

29. The combination in an automatic oil mill having a chamber for holding material for pressure, having automatic means to feed the press, automatic means to discharge the press, means to heat the pressing chambers independent of the heated meal, a maximum pressure indicator, means to predetermine the maximum pressure, means to sustain the pressure at a fixed maximum for a fixed time period, whereby the decline in pressure during this time period will be avoided, as and for the purpose set forth.

30. In a hydraulic press the combination with the press of a pump, an accumulator, a pressure arresting device whereby the pressure in the accumulator is gradually exerted on the cylinder of the press and the pressure in the cylinder controls the pressure arresting device.

31. The combination in an automatic oil mill of a liquid compressing means, a series of hydraulic presses, a conductor from each of the said presses to said compression means, and a device connected with each cylinder of its respective press whereby the pressure in all the series of presses can be varied from zero to a different maximum and regardless of the pressure in the common pressure producing means.

32. The combination in an automatic oil mill of a series of presses, a series of pressure indicators, a series of pressure tripping devices, one for each press, a pump or accumulator, and means for operating the said tripping devices independent of the pressure on the accumulator, whereby each press of the series can have its pressure arrested at a different maximum, and independent of the maximum on the accumulator and independent of the pressure on any other of the series, as and for the purpose set forth.

33. The combination in an automatic oil mill of a series of presses, an accumulator, a conductor leading from the said accumulator to all of the said presses, a series of meal heaters one for each press, a series of means for automatically conducting the heated meal from each heater to its respective press, a series of pressure arresting devices, one for each press, a series of pressure indicators, one for each press, a series of exhaust ports, one for each pressure arrester and a series of means for actuating the said exhaust ports automatically, there being one port for each press, as and for the purpose set out.

34. The combination in an automatic press of a pump, a pressure arresting device, a liquid conductor leading from the pump to the cylinder of the press, and a liquid conductor leading from the cylinder to the pressure arresting device, and a connection between the pressure arresting device and the conductor leading from the pump to the cylinder, whereby as the pressure is raised in the cylinder the said connection will shut off the pressure conveyed in the said conductor to the said cylinder, as and for the purpose set out.

35. In an automatic oil mill having a series of hydraulic presses with cylinders, means for producing hydraulic pressure in the said cylinders, means for controlling the pressure in the said cylinders automatically and independently and simultaneously, means for predetermining a different maximum in all of the said cylinders and whereby as the pressure in each of the said cylinders reaches a predetermined maximum it will be automatically released.

36. In an automatic oil mill having a series of hydraulic presses with cylinders, a compression chamber, a platen working in the said chamber, means for producing pressure in the said cylinders, means for automatically controlling the pressure in the said cylinders independently at the same time, means for releasing the pressure in the said cylinders independently at variable times, whereby as the pressure in each of the said cylinders reaches a predetermined maximum the said pressures will be released independently.

37. In an automatic press the combination of a compression chamber, means for producing pressure therein, a series of partitions forming a series of compartments in the said chamber, a heater, a series of meal packers, one for each compartment, and means for automatically feeding the meal to the said compartments, as and for the purpose set out.

38. In an automatic press the combination of a compression chamber, a series of partitions forming a series of compartments, means for automatically producing pressure in the said compartments, meal packers operating in the said compartments and means for heating the said compartments.

39. In an automatic oil press the combination of a compression chamber, means for automatically heating the walls of the said chamber independent of the heated meal, means for producing pressure in the said chamber, means for packing the meal in the said chamber and automatic means for opening and closing the said chamber as and for the purpose set out.

40. The combination in an automatic press of a compression chamber, means for automatically heating the said chamber independent of the heated meal, means for automatically feeding material into the said chamber means for discharging material from the said chamber after pressure and means for cleaning the said chamber after the residuum is discharged therefrom.

41. The combination in an automatic press of a compression chamber a series of partitions forming a series of compartments in the said chamber, means for packing the meal in the said compartments, means for heating the said compartments independent of the heated meal, lateral metallic walls forming the sides of the said chamber, means for heating the said walls, means for producing pressure in the said chamber and means for discharging the residuum after pressure from the said chamber, as and for the purpose set out.

42. In an automatic oil press the combination of a series of pressing chambers, means for simultaneously producing pressure in the said chambers, means for heating the said chambers, a series of meal packers, one for each of the said chambers and means for automatically feeding the meal from the heater to all of the said chambers.

43. The combination in an automatic oil press of a compression chamber, a series of meal holding compartments in said chamber, means for producing pressure in the said chamber, a lid for the said chamber, means for automatically feeding the meal to the said compartments while the lid is open, means for packing the meal in the said compartments also while the lid is open and means for throwing the meal packing elements out of action while the lid is closed.

44. In an automatic oil mill having a series of seed meal retaining compartments, means for feeding meal to and packing it into the said compartments, drainage members forming the walls of the said compartments and means for heating the said compartments, whereby the flow of the oil is facilitated.

45. In an automatic oil press having a compression chamber, a series of drainage partitions forming a series of compartments in the said chamber, means for feeding meal to and packing it into the said compartments automatically, said partitions comprising a central member for oil conducting and lateral contiguous walls or sections carried by the central member wherethrough oil percolation is effected, and whereby the oil is fed through the said percolating members in and to the drainage members and thus conducted from the chamber and a series of meal packers for packing the meal between the said partitions.

46. In an automatic oil press having a compression chamber, a series of drainage partitions forming a series of compartments in the said chamber, means for packing the meal into the said compartments, said partitions comprising percolating and oil conducting members and a common oil collector for said drainage members, whereby as the oil is conducted from the chamber by the said conductors it is collected by the collector as and for the purpose set out.

47. In an automatic oil press having a compression chamber, a series of drainage partitions forming a series of compartments in the said chamber said partitions comprising oil percolating and oil conducting members, a common oil collector and means for heating the said compartments, whereby the flow of the oil through the conductors to the collector is facilitated, and means for packing the meal between the said oil percolating members as and for the purpose set out.

48. In an automatic oil press having a compression chamber, a series of partitions forming a series of compartments in the said chamber, means for packing the meal in the said chambers, plates forming lateral walls for said chamber and means for heating the said plates and thereby by radiation the said compartments.

49. In an automatic oil press having a compression chamber, a series of drainage partitions forming a series of compartments in the said chamber, said partitions forming oil percolating and oil conducting members, means for pressing the seed meal into the said compartments and packing it therebetween, an oil collector and means for discharging the meal cake residuum from the compartments after oil extraction.

50. In an automatic oil press having a compression chamber, a series of partitions forming a series of compartments in the said chamber, said partitions forming oil percolating and conducting members, a series of meal packers working in the said chambers and means for throwing the said meal packers out of action at a predetermined time.

51. In an automatic oil press having a series of pressing compartments in a common compression chamber, a series of meal packers, one for each compartment of the common chamber, and means for automatically throwing the said packers in and out of action.

52. In an automatic oil press having a compression chamber and a series of compartments therein, a lid for the said chamber, a series of meal packers, automatic means for operating the said packers when the lid is open and means for automatically throwing the packers out of action when the lid is closed.

53. In an automatic oil press having a compression chamber, a series of compartments in the said chamber, means for feeding the meal into the said compartments of the said chamber supplemental means for packing the meal into the said compartments, as and for the purpose set forth.

54. In an automatic oil press having a common compression chamber and a series of compression compartments in the said chamber, a series of meal packers automatically actuated, one for each of the said compartments, means for automatically throwing the said packers into action at a predetermined time, and means for automatically throwing the said packers out of action at a predetermined time, as and for the purpose set forth.

55. In an automatic oil mill a series of compressing compartments means for filling the said compartments simultaneously consisting of individual packers operating in individual compartments, means for heating the said compartments simultaneously, means for packing the meal in said compartments and means for simultaneously discharging the residuum from the said compartments.

56. In an automatic oil press having a compression chamber, a top for said chamber, means for automatically moving the said top on the moving of which the meal passes from the warming to the pressing chamber, a warming chamber over the top for meal warming, a heating or meal cooking chamber over the warming chamber and a hand controlled partition between the heating and the warming chamber.

57. In an automatic oil press having a compression chamber, a top for the said chamber, means for moving the said top a meal warmer over the said chamber, a meal heater or cooker over the said warmer and a hand controlled partition between the warming and the heating chamber, whereby the said hand controlled partition retains the meal in the heating chamber until it is properly heated and thereafter permits the discharging of the said meal into the warmer prior to the opening of the compression chamber.

58. The combination in an automatic oil press of a compression chamber, a series of meal holding compartments in the said chamber, means for heating the said compartments, means for feeding the meal to the said compartments, means for packing the meal into the said compartments, a meal cooker, a meal warmer coacting with the cooker, and whereby as the meal is heated it passes from the cooker to the warmer and from the warmer to the compression chamber wherein it is packed by the packers as and for the purpose set out.

59. The combination in an automatic oil mill of a compression chamber formed into a series of compartments or chambers, an automatic meal supply, reciprocating packers for packing the meal automatically in the said compartments and means for opening the said chamber at a predetermined pressure period.

60. The combination in an automatic oil press having a compression chamber with a series of partitions formed by drainage members in said chamber, a platen, a series of links connecting the said partitions and common locking bars with which said partitions become engaged when extended to the limit of their expansion, as and for the purpose set forth.

61. The combination in an automatic oil press of a compression chamber, a series of drainage partitions in the said chamber, a series of links locking the said drainage members united flexibly and a series of rigid members to which the said drainage members become united rigidly at the extremity of their expansion.

62. In an automatic press having a compound clutch mechanism for shifting power automatically and comprising a prime shaft, a series of primary moving elements operated thereby, a series of secondary moving elements, a clutch interposed between the primary and secondary elements, automatic means for disengaging the clutch from the primary moving elements and engaging the said clutch with the secondary elements, whereby the movement of the said primary elements is simultaneously arrested with the initial movement of the secondary elements.

63. In an automatic press having a compression chamber with a top and a bottom therefor and automatic means for moving the said top and the said bottom, said mechanism comprising a prime shaft, a spring controlled clutch interposed between the said prime shaft and the said bottom moving mechanism, a clutch interposed between the said top moving mechanism and the said prime shaft, automatic means for unlocking the said clutch from the bottom moving mechanism and locking it to the top moving mechanism at a predetermined point in the cycle of the machine, said means comprising a shaft reversing mechanism, whereby as the shaft is reversed the said clutch jaws are released from their frictional contact, and the spring controlled clutch is forced from engagement with one to engagement with the other clutch.

64. In an automatic press having a clutch mechanism for shifting power from a first to a second series of operating elements, said elements comprising one series for opening and closing the lid of a compression chamber, and one series for opening and closing the bottom of the said chamber, a spring between the clutch jaws, a prime shaft, and an automatic belt reversing mechanism, whereby the said prime shaft operates the said clutch normally in one direction, thus operating the first series of elements and whereby the said belt reversing mechanism reverses the clutch permitting the said spring to force the said jaws apart by releasing the said jaws of their frictional contact, thus becoming disengaged from the first and engaged to the second series of elements, as and for the purpose set out.

65. In an automatic press having a compression chamber with a series of drainage compartments in the said chamber, lateral walls to the said chamber, said walls inclined outwardly making the chamber wider at the bottom than at the top, a series of drainage partitions forming the said compartments, said partitions likewise wider at the base than at the top and a platen conforming to the shape of the racks and the chamber walls, and means for packing the meal between the said walls as and for the purpose set out.

66. The combination in an automatic press of a shaft, a clutch jaw carried thereby, a compression chamber, a platen moving therein, a secondary clutch jaw, means interposed between the primary clutch jaw and the shaft whereby the said jaw is compensating and can oscillate to a limited degree, and means controlled by a moving part of the mechanism for locking the clutch jaws together at a predetermined cycle of the machine, as and for the purpose set out.

67. The combination in an automatic press of a shaft, a clutch jaw, a key fixed to the shaft, a longitudinal key seat in the clutch enlarged beyond key requirements for normal action, two springs, one on either side of the key, whereby the key is normally retained medial in the enlarged slot of the clutch and can oscillate in either direction.

68. In an automatic press having a cylinder, a pressure controller, a platen and a pressing chamber in which said platen moves, means for producing hydraulic pressure in the said cylinder, the cylinder being interposed between the pressure producing means and the said pressure controller, as and for the purpose set out.

69. A hydraulic press comprising in combination with the cylinder consisting of a pressure controller whose water supply is received through the said cylinder, means for controlling the maximum pressure through the cylinder, combined with a means for producing maximum pressure in the said cylinder consisting of a pump and a liquid conductor between the said pump and the said hydraulic cylinder.

70. A hydraulic press comprising in combination with the cylinder a pressure producing means, a liquid conductor leading from the said means to the said cylinder, a pressure sustainer, a conductor leading from the said cylinder to the said sustainer, whereby the pressure in the sustainer is the same as that in the cylinder.

71. A hydraulic press comprising in combination with the cylinder a pressure producing means, a liquid conductor leading from the pressure producing means to the said cylinder, a pressure sustainer, a conductor leading from the said cylinder to the said sustainer, means for predetermining the maximum pressure for the said sustainer, whereby the pressure in the cylinder actuates the sustainer.

72. An automatic oil mill comprising in combination with a series of hydraulic presses having cylinders, a series of means for controlling the pressure at maximum through the said cylinders, means for controlling the pressure by a pressure controller hydraulically operated through the said hydraulic cylinder, one for each cylinder and means for producing pressure in the said cylinders.

73. An automatic oil mill comprising in combination with a series of cylinders, a series of means for controlling the pressure at maximum through the said cylinders independently, and means for independently sustaining the pressure at maximum for predetermined time periods and means for producing pressure in the said cylinders, as and for the purpose set out.

74. An automatic oil mill comprising in combination with a series of cylinders a series of means for controlling the pressure in the said cylinders at maximum, means for holding the pressure at maximum simultaneously in the different presses of the series and means for regulating the maximum pressure independently and a common means for producing pressure in the said cylinders.

75. An automatic press in combination with a cylinder, of means for producing pressure in the said cylinder from zero to a predetermined maximum, means for arresting the action of the pressure producing means when the pressure reaches the predetermined maximum and means for maintaining the pressure at maximum for a fixed time period automatically, as and for the purpose set out.

76. An automatic press and as a sub-combination thereto of a means for producing pressure in the cylinder of the press, means for arresting the pressure at a predetermined pressure limit, means for maintaining the pressure at maximum for a fixed time period, means for predetermining this time period, said means holding the predetermined pressure for the predetermined time regardless of the actual time intervening between the initial and final moments of maximum pressure.

77. An automatic press in combination with the hydraulic cylinder of a means for producing compression in said cylinder from zero to a fixed maximum, means for arresting the action of the pressure producing means on said pressure reaching maximum, means for sustaining the said pressure for a fixed time period, means for automatically starting the pressure producing means if the pressure should fall below maximum during the period of pressure sustaining, as and for the purpose set forth.

78. In an automatic press having a compression chamber said chamber having a series of filtering and drain partitions with a movable lid and a movable bottom in combination with a prime mover in the machine, a mechanical connection between the lid and the prime mover, a common mechanical connection between the said prime mover and said drainage partitions a mechanical connection between the bottom and the prime mover, means for producing compression in the compression chamber and means for predetermining the degree of pressure to be exerted in the said chamber before the bottom actuating mechanism can be actuated.

79. In an automatic press having a compression chamber with a movable lid and a movable bottom in combination with automatic mechanism to actuate the said lid and bottom, a prime shaft or mover in the machine, a mechanical connection between the lid and the prime mover, a mechanical connection between the bottom and the prime mover, means to predetermine the degree of pressure the chamber shall receive before the bottom actuating mechanism will be moved, and means whereby as the pressure reaches the predetermined degree the bottom actuating mechanism will be moved and after the said bottom is opened and closed the said automatic mechanism will open and close the lid of the chamber, as and for the purpose set out.

80. In an automatic press having a compression chamber with an inlet thereto and an outlet therefrom, in combination with a prime mover in the machine, means for closing the inlet, means for opening and closing the outlet, a mechanical connection between the said means for closing the inlet and the said prime mover, a mechanical connection between the said means for closing the outlet and the said prime mover and means to variably predetermine the pressure at which the outlet operating means will be operated, and whereby as the maximum pressure is reached the outlet will be opened automatically and as the outlet is closed the inlet will be opened, as and for the purpose set out.

81. In an automatic press having a compression chamber, an inlet thereto, an outlet therefrom, mechanism for opening the inlet, mechanism for opening the outlet, a prime shaft, a clutch mechanism between the inlet and the outlet operating mechanism, a spring between the jaws of the said clutch and a reversing device for the prime shaft, whereby after the inlet is opened and closed the clutch mechanism will be disengaged by the stopping of the machine and the reversing of the prime shaft, thus permitting the spring to force the clutch jaws apart.

82. In an automatic machine having clutch jaws lockable in operative engagement, a spring therebetween, in combination with a prime mover and means for automatically reversing the prime mover at a predetermined rotation of the said clutch jaws, as and for the purpose set out.

83. In an automatic machine having clutch jaws locked in operative engagement during the performance of their functions, a spring between the prime and the secondary jaw, means for automatically arresting the rotary motion of the prime clutch jaw at a predetermined rotation of the secondary jaw, means for reversing the motion of the prime clutch jaw thereby permitting the said spring to disengage said jaws and means for giving the said jaws thereafter their normal rotation.

84. The combination in an automatic press having a pressing chamber, a movable lid, means to move the lid automatically, a movable bottom, means to move the bottom automatically, a clutch consisting of two locking members, a spring for forcing the said two members apart, and means to assist the said springs for forcing the jaws apart and consists of an automatic clutch jaw mechanism, whereby the said releases the clutches from frictional engagement and the spring then with unerring reliability forces the clutches apart, as and for the purpose set out.

85. An automatic press in combination with the compression cylinder of a means for producing pressure in the said cylinder from zero to a fixed maximum, and a leakage anticipating means consisting of an automatic means for actuating the pressure producing means on the fall of pressure and means for arresting the pressure at a fixed maximum, whereby the pressure is held at the fixed maximum and should it at any time fall below maximum the said means will cause the pressure producing means to be actuated and when it rises to maximum the pressure will be so maintained until it should again fall by leakage, as and for the purpose set out.

86. The combination in an automatic press having a compression chamber and a top and bottom for the said chamber of a knife carried by the said top, and a yielding wing, said wing movable by pressure of the said knife, or by the interposition of an object between the knife and the wing for the purpose set out.

87. In an automatic press having a compression chamber in which pressure is exerted, a movable entrance way to said chamber and a cutting means carried by the said entrance way and a movable wing yielding on pressure of the said entrance way as and for the purpose set out.

88. The combination in an automatic press having a compression chamber with an inlet to said chamber and an outlet therefrom and means for producing pressure in the said chamber, with automatic means for operating the inlet and the outlet of a knife carried by the said inlet, and a yielding member controlled in its yielding function by the said inlet as and for the purpose set out.

89. In an automatic press having a compression chamber and a moving lid to the said chamber and an automatic feeding means to said chamber, of a cutting means carried by the said lid, said means operated after each intermittent filling of the chamber and a wing shielding the said entrance way by yielding to pressure thereon from the said entranceway and as the said entranceway is closed.

90. In an automatic oil press having a compression chamber with an inlet and an outlet, a meal heater, means for automatically feeding the meal through the heater to the chamber, means for packing the meal in the said chamber, means to open and close the inlet, means to open and close the outlet and automatic mechanism for locking the inlet operating mechanism while the outlet operating mechanism is working and means for locking the outlet operating mechanism while the inlet operating mechanism is performing its function.

91. In an automatic oil mill having a series of presses working as a unit in combination with a common pressing energy, a series of pressure controllers, a series of time recorders, one pressure and time controller for each press, and whereby the said recorders and controllers are entirely independent each of all the others, as and for the purpose stated.

92. In an automatic press for liquid extracting by hydraulics having a cylinder, a compression chamber, an exhaust valve leading from the said cylinder, an automatic time lock and automatic means for operating the said lock and opening the said valve at maximum pressure.

93. In an automatic press and as a sub combination to a hydraulic press the combination with the cylinder of the press of an exhaust valve leading from the said cylinder and automatic means for opening the said valve at maximum pressure and means connected with a moving part of the automatic mechanism for closing the said valve at a predetermined functional work of the machine.

94. In an automatic hydraulic press having a compression chamber, a hydraulic cylinder, an exhaust valve leading from the said cylinder, means for closing the said valve automatically after chamber filling comprising a moving element in the machine co-acting with the valve and before pressure and means for opening said valve at maximum pressure automatically.

95. In an automatic hydraulic press having a compression chamber, a cylinder, an exhaust valve from the said cylinder, a lock for the said valve and means for automatically actuating the said valve after maximum pressure.

96. In an automatic hydraulic press having a compression chamber, a hydraulic cylinder, an exhaust valve from the said cylinder, a lock for the said valve, a trip for the said lock and means for automatically actuating the said trip at maximum pressure.

97. In an automatic press having a hydraulic cylinder, and exhaust valve from the said cylinder, a lock for the said valve, a trip for the said lock, a carriage for the said trip and means for automatically moving the carriage after the fall of pressure.

98. In an automatic press having a compression chamber and a series of drainage partitions in the said chamber forming thereby a series of drainage compartments, said partitions being drainage members, lateral walls for the said chamber and part of the said partitions extending beyond the said walls, means for connecting the said partitions together through the chamber extension portion of the said partition, thereby providing a common means for moving the said partitions, as set out.

In testimony whereof I affix my signature in presence of two witnesses.

HOMER A. HERR.

Witnesses:
C. W. McMahon,
Christian F. Huber.